United States Patent
Enomoto et al.

(10) Patent No.: US 6,966,536 B2
(45) Date of Patent: Nov. 22, 2005

(54) FLUSH VALVE DEVICE OF FLUSH TOILET

(75) Inventors: Kazuyuki Enomoto, Kitakyushi (JP); Jyunichi Tani, Kitakyushu (JP); Katsuhiko Nagano, Kitakyushu (JP); Akihiko Koba, Kitakyushu (JP)

(73) Assignee: Toto Ltd., Fukuoka (JP)

( * ) Notice: Subject to any disclaimer, the term of this patent is extended or adjusted under 35 U.S.C. 154(b) by 145 days.

(21) Appl. No.: 10/399,958

(22) PCT Filed: Nov. 8, 2001

(86) PCT No.: PCT/JP01/09801

§ 371 (c)(1),
(2), (4) Date: Aug. 20, 2003

(87) PCT Pub. No.: WO02/38873

PCT Pub. Date: May 16, 2002

(65) Prior Publication Data

US 2004/0026640 A1    Feb. 12, 2004

(30) Foreign Application Priority Data

Nov. 10, 2000 (JP) ............................. 2000-342788
Apr. 23, 2001 (JP) ............................. 2001-123892
Apr. 23, 2001 (JP) ............................. 2001-123900
Jul. 11, 2001 (JP) ............................. 2001-210721

(51) Int. Cl.$^7$ ............................................. F16K 31/00
(52) U.S. Cl. ...................... 251/40; 251/294; 137/559
(58) Field of Search .................. 251/294, 40; 137/559

(56) References Cited

U.S. PATENT DOCUMENTS

| 1,864,827 | A | * | 6/1932 | Jenkins et al. .............. 251/295 |
| 2,448,231 | A | * | 8/1948 | Molloy ....................... 251/294 |
| 2,633,141 | A | * | 3/1953 | Russell ....................... 251/294 |
| 2,959,980 | A | * | 11/1960 | Kocour ....................... 251/294 |
| 3,406,940 | A | * | 10/1968 | Kertell ........................ 251/40 |
| 3,594,828 | A | * | 7/1971 | Seek ........................... 251/294 |
| 5,362,026 | A | * | 11/1994 | Kobayashi et al. ...... 251/30.05 |
| 6,019,343 | A | * | 2/2000 | Tsai ............................. 251/40 |
| 6,089,542 | A | * | 7/2000 | Caravella et al. ........... 251/294 |
| 6,298,872 | B1 | * | 10/2001 | Keller ......................... 251/294 |

FOREIGN PATENT DOCUMENTS

| JP | 61-87043 A | 5/1986 |
| JP | 64-37579 | 3/1989 |
| JP | 2-132780 | 11/1990 |
| JP | 11-061948 | 3/1999 |
| JP | 2000-265521 | 9/2000 |

* cited by examiner

Primary Examiner—John Bastianelli
(74) Attorney, Agent, or Firm—Beyer Weaver & Thomas, LLP

(57) ABSTRACT

A flush valve device 20 of a flush toilet includes a flush valve body 22 connected to a city water source and an operation unit 50. The operation unit 50 has an operation button 63 and a flexible inner cable 71, which is part of a cable mechanism 70. The inner cable 71 is extended from a rear side to a lateral side of a toilet body 12 and is linked with the operation button 63. In response to a press of the operation button 63, the flush valve body 22 opens to make a supply of washing water flown into the toilet body 12. This arrangement desirably increases the degree of freedom in positioning of the flush valve body and the operation unit, enhances the operability of the flush valve device 20, and effectively facilitates installation of the flush valve device 20.

26 Claims, 27 Drawing Sheets

PRIOR ART

FLUSH VALVE DEVICE OF FLUSH TOILET

TECHNICAL FIELD

The present invention relates to a flush valve device of a flush toilet and more specifically pertains to an operation unit and an installation mechanism.

BACKGROUND ART

A prior art flush valve device is disclosed, for example, in JAPANESE PATENT LAID-OPEN GAZETTE No. 11-324061. FIG. 32 illustrates a rear portion of a flush toilet with a prior art flush valve device mounted thereon. As shown in FIG. 32, a flush valve device 310 connected to a city water source is located in the rear portion of a flush toilet 300. The flush valve device 310 includes a flush valve body 312 and an operation unit 320 that is used to open and close the flush valve body 312. The flush valve body 312 has a main valve to open and close a main water conduit and a pilot valve to lower the water pressure in a back pressure chamber and thereby open the main valve. The operation unit 320 functions to incline a driving rod of the pilot valve, so that a supply of washing water is flown into the flush toilet 300. The operation unit 320 has a rotating handle 322 and a transmission member 324 that is formed as an axis and rotates along its axial center with a rotation of the rotating handle 324 to transmit an operating force. In response to a rotation of the rotating handle 324, the flush valve body 312 is opened via the transmission member 324 to make a supply of washing water flown into the flush toilet 300.

In order to transmit the rotational force to the flush valve body 312, the rotating handle 322 should be located on a lateral side of the flush valve body 312. This undesirably lowers the degree of freedom in positioning of the flush valve body 312 and the rotating handle 322. The restricted positions of the rotating handle 304 and the flush valve body 312 may lower the operability of the flush valve device 310 and make installation of the flush valve device 310 rather troublesome.

DISCLOSURE OF THE INVENTION

The object of the present invention is thus to solve the drawbacks of the prior art technique and to provide a flush valve device of a flush toilet that has the increased degree of freedom in positioning of a flush valve body and an operation unit and the enhanced operability and allows for easy installation and maintenance.

The object of the present invention is also to provide means that allows for easy setting of a flush valve device without any damage even when a fixation wall or a wall fixation frame has a dimensional error.

In order to attain at least part of the above and the other related objects, the present invention is directed to a flush valve device of a flush toilet, which includes: a flush valve body having: a main valve that is disposed in a main water conduit to open and close the main water conduit; a pilot valve that presses the main valve in a closing direction and parts a back pressure chamber; and a driving rod that is attached to the pilot valve, where the driving rod is inclined to lower water pressure in the back pressure chamber and thereby open the main valve; and a manual operation unit that functions to open the pilot valve. A supply of washing water is flown into a toilet in response to an operation of the manual operation unit.

The manual operation unit includes: a flexible transmission member; an operation button that is pushed up and down in response to a pressing operation; an operating force conversion mechanism that is coupled with one end of the transmission member and converts an operating force generated by a pressing operation of the operation button into a tensile force of pulling the transmission member; and a tilting mechanism that is coupled with the other end of the transmission member and moves to incline the driving rod in response to a pull of the transmission member.

In the flush valve device of the present invention, in response to a pressing operation of the operation button included in the operation unit, the operating force conversion mechanism converts the operating force generated by the pressing operation into a tensile force of pulling the transmission member. The converted tensile force opens the pilot valve and the main valve of the flush valve body to make a supply of washing water from the main water conduit flown into the flush toilet.

Conversion of the operating force generated by the pressing operation of the operation button into the tensile force of pulling the transmission member enables the thin flexible transmission member to be laid out over a long distance without causing any buckle. The operation button may thus be located at a position apart from the flush valve body. This desirably increases the degree of freedom in positioning of the operation button. For example, the operation button may be located on a lateral side of the flush toilet. This arrangement enables the user to wash the flush toilet without turning around, thus ensuring the enhanced operability.

The operation unit is a push type with an operation button. The operating element of the operation button is extended only slightly from the bathroom wall, while the conventional operating lever is extended to a significant height. This structure prevents the operation button from being readily damaged due to frequent, rough actions.

In one preferable embodiment of the transmission member, whole or part of the transmission member is a wire that is bendable and transmits the operating force in a bended state, for example, a wire made of a metal. The operation button can thus be located at a position apart from the flush valve body. In this embodiment, it is preferable that the transmission member is coated with a cover member that supports the transmission member in a slidable manner. Such coating enables the transmission member to work effectively without any interference with other members.

In accordance with one preferable application of the flush valve device, the operation button and the flush valve body are arranged substantially perpendicular to a center of the flush toilet, and the transmission member is bent and arranged at substantially right angles to couple the operation button with the flush valve body.

One preferable embodiment of the operating force conversion mechanism uses a spring that restores the operation button, which has been subjected to the pressing operation, to an original position thereof. This simple structure enables the operation button to be restored to its original state.

The operating force conversion mechanism of this embodiment may further include a slide member that pulls the transmission member in a sliding direction. The slide member has an inclined plane to convert the operating force of the operation button into a moving force in a direction substantially perpendicular to a direction of the operating force.

Diverse structures may preferably be applied to the tilting mechanism according to the structure of the flush valve body and the layout of the operation button:

(1) The tilting mechanism has an engagement member that engages with the driving rod and thereby inclines the driving rod in response to a pull of the transmission member.

(2) The tilting mechanism has: a pressure bar that presses and thereby inclines the driving rod; and a pressing force conversion member that converts a tensile force of the transmission member into a force of pressing the driving rod.

(3) The tilting mechanism has a rotary member that has one end supported in a pivotally rotatable manner and the other end coupled with the transmission member and applies a pressing force to the pressure bar in response to a tensile force of the transmission member.

(4) The tilting mechanism has a coupling board that is arranged to move in parallel in an identical direction with a forward-backward moving direction of the pressure bar and applies a pressing force to the pressure bar in response to a tensile force of the transmission member.

(5) The tilting mechanism has a swing lever that has one end supported in a swinging manner and the other end coupled with the transmission member and applies a pressing force to the pressure bar in response to a tensile force of the transmission member.

The tilting mechanism may further include a spring that presses a pressure bar against a moving force of the pressure bar in response to a pull of the transmission member and restores the pressure bar to an original position thereof when the tensile force is released. This arrangement enables the pressure bar to be readily restored to its original position.

In accordance with another preferable application of the flush valve device, the tilting mechanism is constructed to enable the main valve and the pilot valve to be unfixed while the tilting mechanism is attached to the flush valve member. This facilitates cleaning and maintenance of the main valve, the pilot valve, a filter disposed in the flush valve body, and other elements.

It is preferable that the operation button subjected to the pressing operation has an operating face that is formed to a concave curve around the shape of a finger. This structure fits the finger and thus ensures the favorable operability.

In one preferable embodiment of the present invention, the flush valve device further includes: a partition wall that is arranged to face a bathroom across a space for receiving the flush valve body therein; a wall fixation frame mounted on the partition wall; and a cover panel attached to the wall fixation frame to face the bathroom. In this application, the manual operation unit is fixed to the wall fixation frame.

The flush valve body is located in the space defined by the bathroom and the partition wall and is protected from accidental and purposeful touches and actions, which may cause failure.

In the flush valve device of this arrangement, the manual operation unit and the transmission unit are readily exposed to the bathroom by simple detachment of the cover panel. This facilitates maintenance of the manual operation unit and the flush valve body. The manual operation unit is fixed to the wall fixation frame. This ensures easy removal of the cover panel without causing detachment of the manual operation unit linked with the transmission member.

The partition wall may be any member that faces the bathroom to define a parted space and conceals the flush valve body from the bathroom. For example, the partition wall may be a bathroom wall originally constructed as part of the bathroom or a side wall of a cabinet located in the bathroom.

In one preferable embodiment, the wall fixation frame has an inspection opening that is used for inspection of the flush valve body. This arrangement facilitates inspection of the flush valve body. The wall fixation frame may be made of diverse materials based on the location of installation and other conditions. Resin molding of the wall fixation frame reduces the manufacturing cost, whereas metal molding of the wall fixation frame increases the strength.

As long as the cover panel is attachable to and detachable from the partition wall, the cover panel may be made of any suitable material and may have any suitable shape. The cover panel is attached to the wall fixation frame, for example, by means of fastening members like screws or by means of magnets. The magnets used for fastening the cover panel are not exposed to the bathroom and are thus protected from any accidental and purposeful touches and actions.

In one preferable application of this embodiment, the flush valve device is equipped with an auto water flow mechanism that detects a human body with a sensor to actuate the flush valve body, in addition to the manual operation unit. In this structure, simple detachment of the cover panel allows for easy maintenance of the auto water flow mechanism, for example, repair of the sensor and replacement of batteries, in addition to the maintenance of the flush valve body.

In another preferable application of this embodiment, the partition wall has fixation walls facing each other across a preset interval, and the wall fixation frame has a substantially rectangular frame assembly including fixation frames arranged along the fixation walls and joint frames used for joining the fixation frames with each other, an opening defined by the frame assembly, and fixtures formed on the fixation frames. The flush valve device further includes: frame clamps, each of which has a front piece and a side piece to be formed in an L shape and is used to fix the wall fixation frame to the fixation wall; first fasteners, each of which is used to fix the front piece to the fixture at a changeable fixation position along the fixation wall; and second fasteners, each of which is used to fix the side piece close to the fixation wall.

In this application, the wall fixation frame is fixed to the fixation walls facing each other across a preset interval. The wall fixation frame has a substantially rectangular frame assembly including the fixation frame and the joint frames. The frame assembly has an opening, which allows for inspection of various elements, for example, valves, of the flush toilet.

The wall fixation frames are fixed to the fixation walls at the positions of the fixtures formed on the fixation frames by means of the frame clamps. Each of the frame clamps has a front piece and a side piece to be formed in an L shape. The front piece of each frame clamp is fixed to the fixture by means of the first fastener, while the side piece of the frame clamp is directly fixed to the fixation wall by means of the second fastener. The frame clamp is designed to enable its fixation position to be changed along the fixation wall. Changing the fixation position enables the frame clamp to be closely fixed to the fixation wall, even if there is a working error of the interval between the facing fixation walls or there is a dimensional error of the frame assembly. The wall fixation frame is accordingly protected from any extensive force and resulting damages in the process of fixing the frame clamps with the second fasteners, even if there is a working error of the fixation walls.

In one preferable embodiment of the wall fixation frame, each of the fixation frames has a notch in a periphery of the fixture to prevent engagement of the second fastener with the fixation frame and to allow direct attachment of the second fastener to the fixation wall. This structure effectively protects the fixation frames from any extensive force of the second fasteners, when the second fasteners are attached to the fixation walls via the notches. The notch is formed only in the vicinity of the fixture on the fixation frame. This structure does not substantially lower the mechanical strength of the fixation frames.

In one preferable structure, each of the fixtures formed on the wall fixation frame has a fixation recess to slide and position the front piece of the frame clamp. This ensures accurate positioning of the frame clamps.

In one preferable structure, each of the first fasteners has a screw and nut used to fix the front piece of the frame clamp to the fixture, and each of the frame clamps has a slot used to change the position of the screw and thereby readily change the fixation position. Each of the second fasteners may have a screw that is screwed in the fixation wall.

BEST MODES OF CARRYING OUT THE INVENTION

A. First Embodiment

Figure 1:
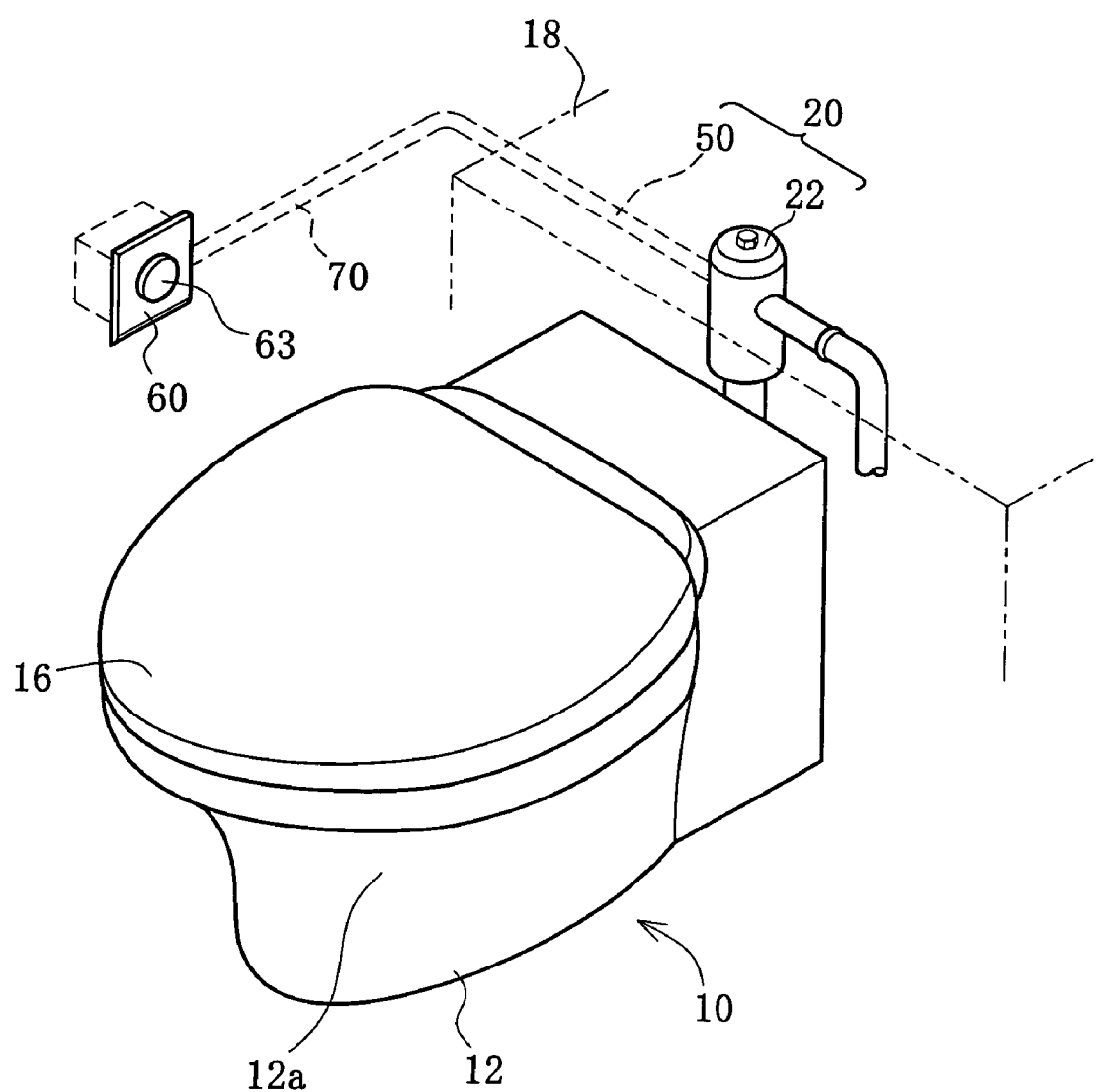
FIG. 1 illustrates the periphery of a flush toilet 10 equipped with a flush valve device in a first embodiment of the present invention.

FIG. 1 illustrates the periphery of a flush toilet 10 equipped with a flush valve device in a first embodiment of the present invention. As shown in FIG. 1, the flush toilet 10 has a toilet body 12 including a bowl section 12a. A toilet seat 16 is attached in an openable and closable manner to the upper face of the bowl section 12a. A cabinet 18 is located in the rear side of the toilet body 12, and a flush valve device 20 is disposed in the cabinet 18. The flush valve device 20 has a flush valve body 22 connected to a city water source and an operation unit 50 used to activate and operate the flush valve device 20.

Figure 2:
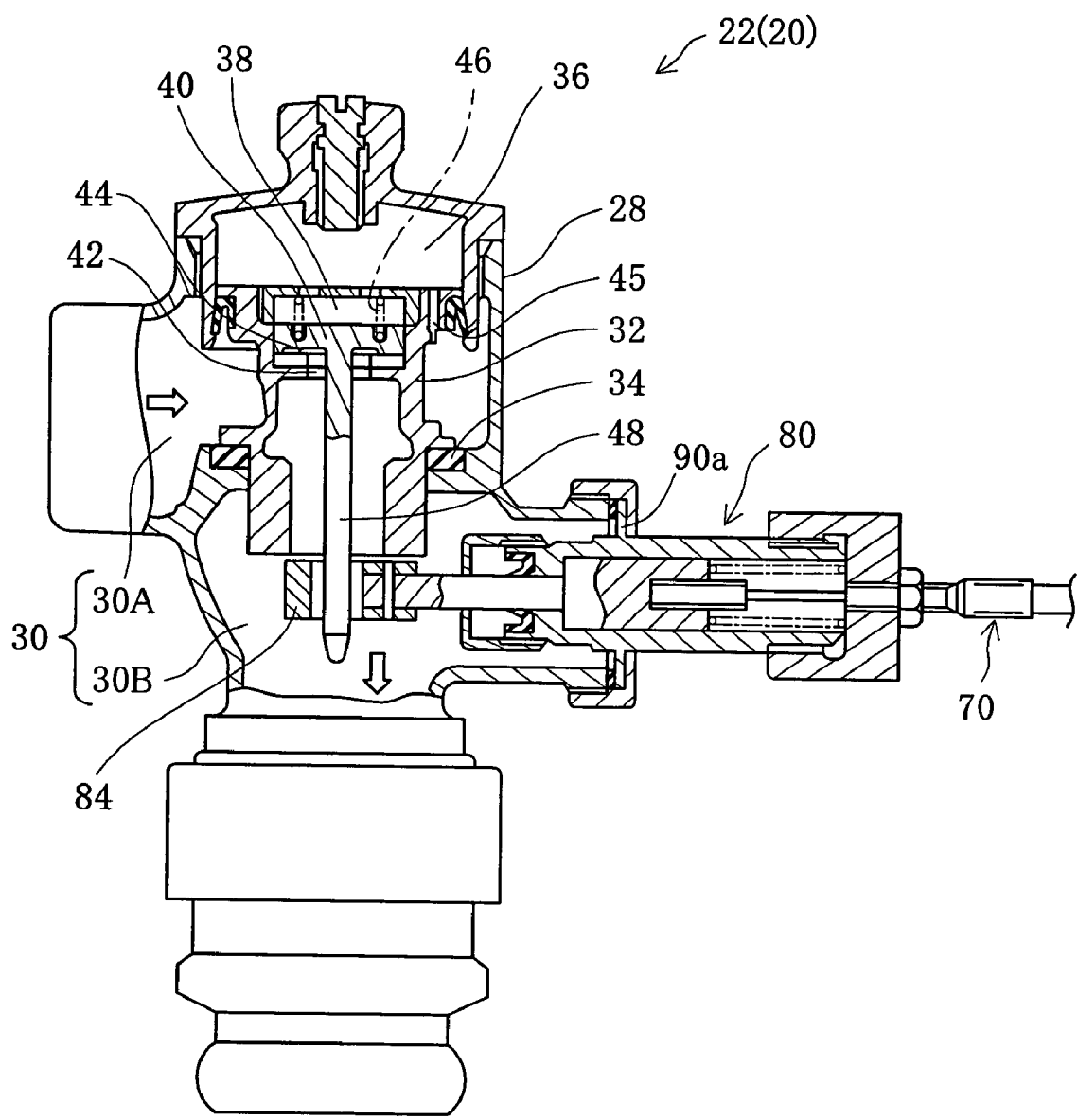
FIG. 2 is a sectional view illustrating the periphery of a flush valve body 22.

FIG. 2 is a sectional view illustrating the periphery of the flush valve body 22. As shown in FIG. 2, the flush valve body 22 has a main water conduit 30 constructed inside a casing 28. A main valve 32 is disposed in the main water conduit 30 to open and close the main water conduit 30. Seating of the main valve 32 on a valve seat 34 disconnects an upstream primary water conduit 30A from a downstream secondary water conduit 30B. Separation of the main valve 32 from the valve seat 34, on the other hand, connects the primary water conduit 30A with the secondary water conduit 30B.

A back pressure chamber 36 is formed above the main valve 32. The water pressure in the back pressure chamber 36 applies a downward pressing force to the main valve 32 to make the main valve 32 in contact with the valve seat 34 in the normally state. Namely the main valve 32 closes the main water conduit 30 in the normally state.

The main valve 32 is formed in a substantially cylindrical shape and has an internal water chamber 38 connecting with the back pressure chamber 36. A pilot valve 40 received in the water chamber 38 functions to open and close a communication path 42, which communicates the water chamber 38 and the back pressure chamber 36 with the secondary water conduit 30B of the main water conduit 30.

Seating the pilot valve 40 on a valve seat 44 via a gasket closes the communication path 42. Upward separation of the pilot valve 40 from the valve seat 44, on the contrary, opens the communication path 42 to communicate the water chamber 38 and the back pressure chamber 36 with the secondary water conduit 30B. The pilot valve 40 is usually pressed downward by means of a spring 46 received in the water chamber 38.

A driving rod 48 is extended downward from the lower face of the pilot valve 40. The driving rod 48 is inclined integrally with the pilot valve 40. The pilot valve 40 and the driving rod 48 can wholly be inclined when an operating force is applied from any of 360 degrees about the axial center in a direction perpendicular to the axis of the driving rod 48.

In the flush valve device 20 of the above construction, the inclination of the pilot valve 40 opens the communication path 42 to make the water (water pressure) in the water chamber 38 and the back pressure chamber 36 flown through the communication path 42 into the secondary water conduit 30B.

Figure 3:
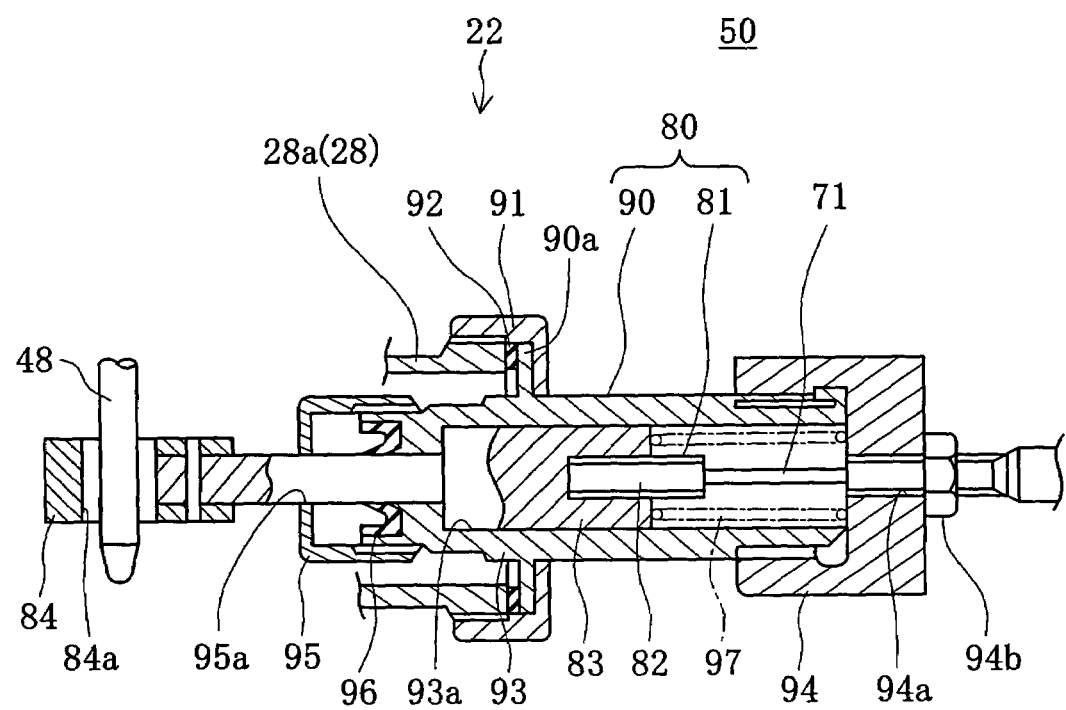
FIG. 3 shows a manual operation unit 50.
Figure 3:
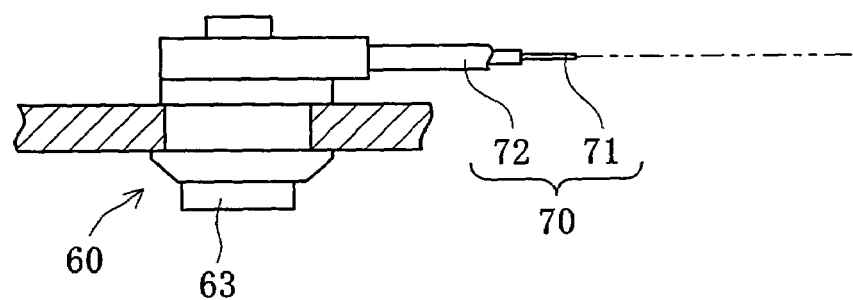

FIG. 3 shows the manual operation unit 50. As illustrated in FIG. 3, the manual operation unit 50 includes a button unit 60, a cable mechanism 70, and a coupling mechanism 80. In response to a manual operation of the button unit 60, the manual operation unit 50 inclines the driving rod 48 via the cable mechanism 70 and the coupling mechanism 80 to activate a washing operation of the flush valve body 22.

Figure 4:
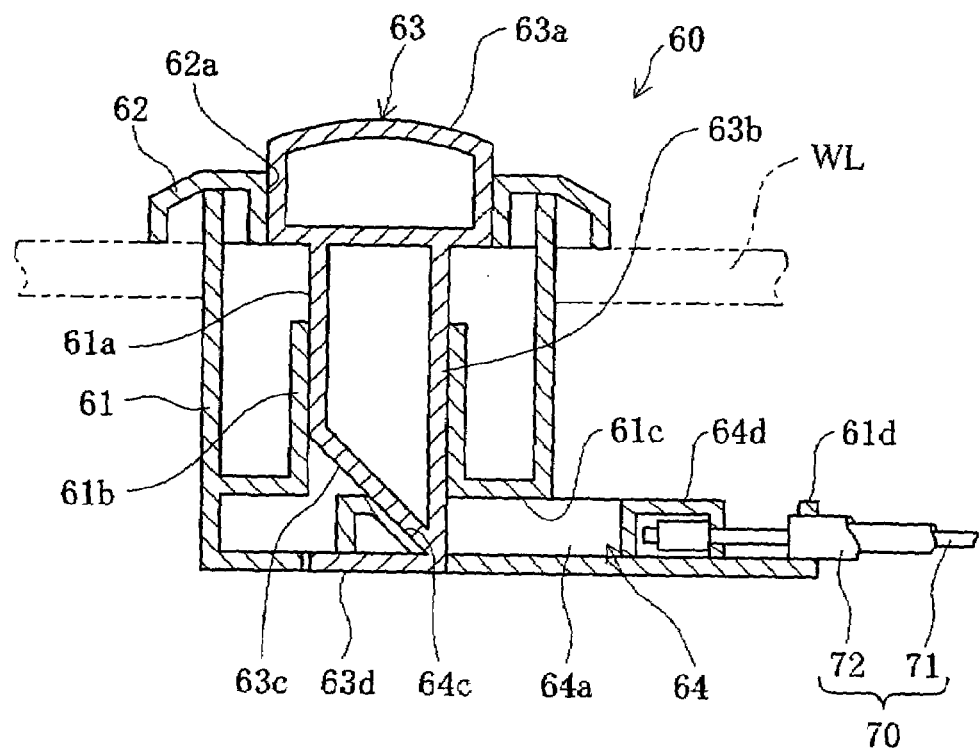
FIG. 4 is a sectional view illustrating a button unit 60.

FIG. 4 is a sectional view illustrating the button unit 60. As shown in FIG. 4, the button unit 60 includes a casing member 61 that is attached to a bathroom wall WL and has a storage chamber 61a, a cover 62 that covers over the periphery of an opening of the casing member 61 and has a through hole 62a, an operation button 63 that is fit in the through hole 62a in a slidable manner and is movable by a pressing operation, and a sliding mechanism 64 that applies a tensile force to the cable mechanism 70 in response to a press of the operation button 63.

The operation button 63 has an operating element 63a that is extended and retreated relative to the cover 62, and an operating projection 63b that is extended from the lower face of the operating element 63a and is held in a support cylinder 61b of the casing member 61 in a slidable manner. A button-side inclined plane 63c is formed on the lower face of the operating projection 63b, and a stopper piece 63d is disposed further below the button-side inclined plane 63c.

Figure 5:
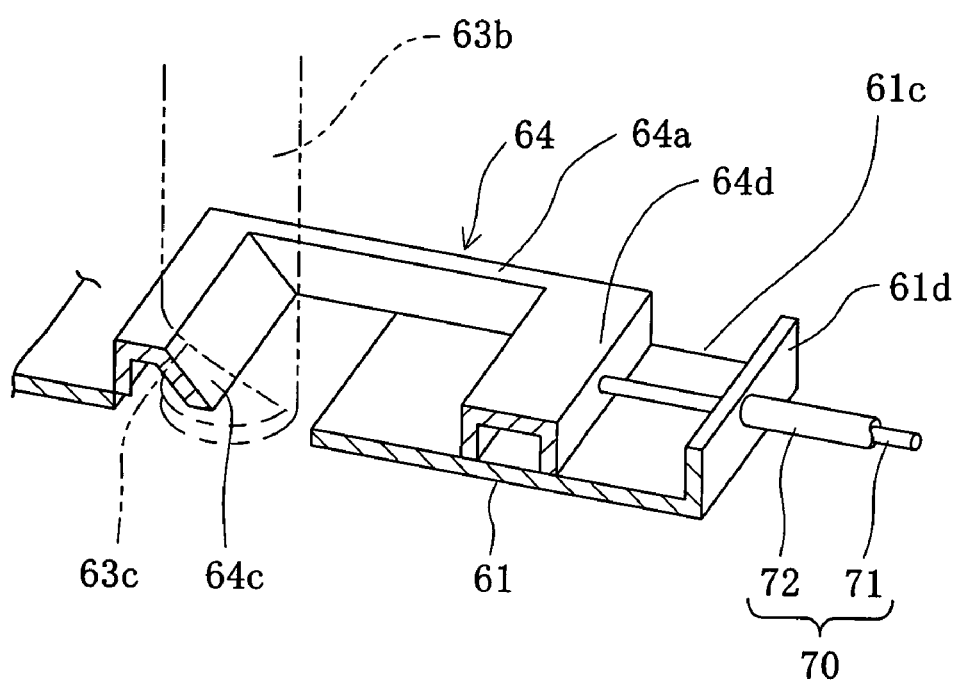
FIG. 5 is a perspective view illustrating a sliding mechanism 64.

FIG. 5 is a perspective view illustrating the sliding mechanism 64. The sliding mechanism 64 has a slide member 64a, which is supported on a guide lane 61c formed in the casing member 61 in a slidable manner. The slide member 64a is constructed as a frame to receive the operating projection 63b perpendicularly inserted in a center thereof. One end of the slide member 64a has a fixture 64d to fix one end of the cable mechanism 70, while the other end of the slide member 64a forms a slide-side inclined plane 64c. The slide-side inclined plane 64c comes into close contact with the button-side inclined plane 63c.

Figure 6:
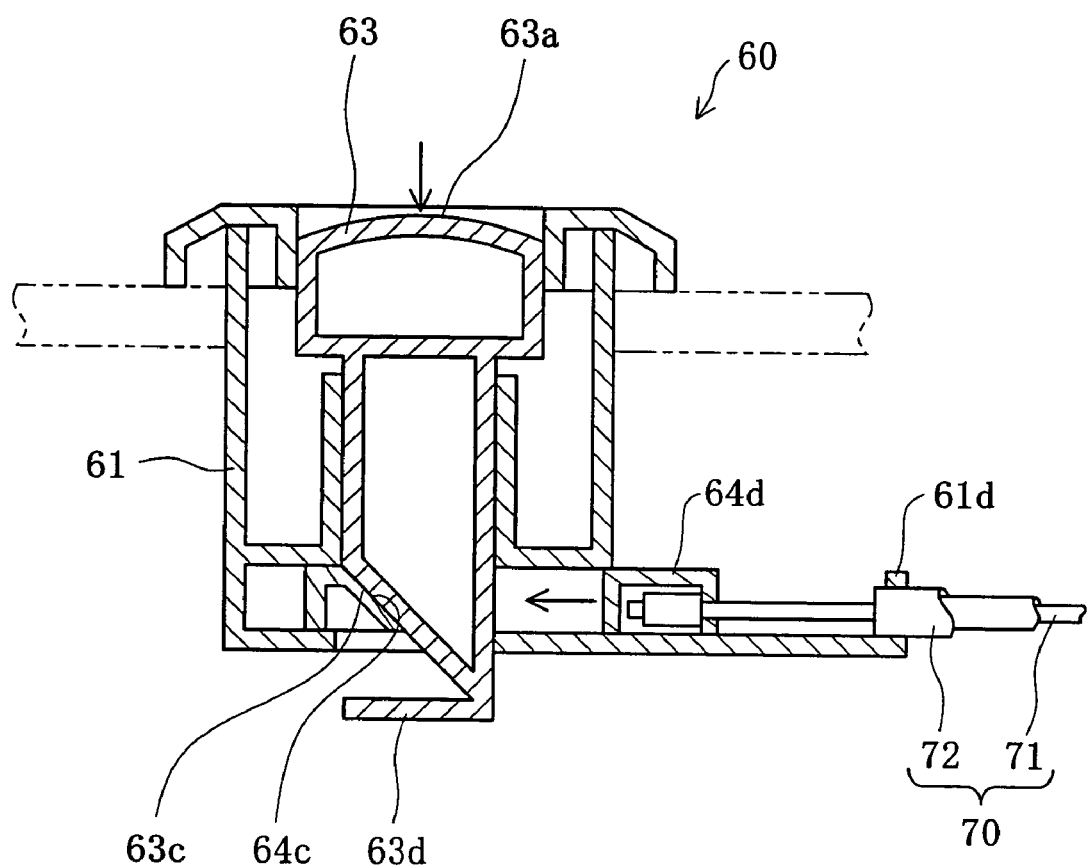
FIG. 6 shows an operation of the button unit 60.

In the button unit 60 thus constructed, as shown in FIG. 6, in response to a press of the operating element 63a, the button-side inclined plane 63c presses the slide-side inclined plane 64c to move the slide member 64a leftward in the drawing against a tensile force from the cable mechanism 70. When the pressing force applied to the operating element 63a is released, the slide member 64a is restored to its original position (see FIG. 4) by the tensile force from the cable mechanism 70.

The cable mechanism 70 includes an inner cable 71 and an outer cable 72 that covers the outer circumference of the inner cable 71 and is arranged substantially concentrically with the inner cable 71. The inner cable 71 (transmission member) and the outer cable 72 are respectively made of a flexible wire and a flexible pipe that are bent and laid out inside the wall of the bathroom.

One end of the outer cable 72 is fixed to a fixing end 61d of the casing member 61 of the button unit 60. One end of the inner cable 71 is fixed to the fixture 64d of the sliding member 64a. The inner cable 71 is thus held movably in the outer cable 72.

The other end of the inner cable 71 is linked with the coupling mechanism 80 as shown in FIG. 3. The coupling mechanism 80 includes a link 81 attached to the other end of the inner cable 71 and a support structure 90 to support the link 81 relative to the flush valve body 22.

The link 81 includes a screw element 82 fixed to the other end of the inner cable 71, a plunger 83 screwed to the screw element 82, and an engagement ring 84 fixed to an end of the plunger 83. The engagement ring 84 has a through hole 84a, and the driving rod 48 passes through the through hole 84a via a predetermined space.

The support structure 90 functions to fasten the other end of the cable mechanism 70 to the flush valve body 22 and includes a clamp 91, a gasket 92, a joint cylinder 93, an outer cap 94, an inner cap 95, another gasket 96, and a spring 97.

Figure 7:
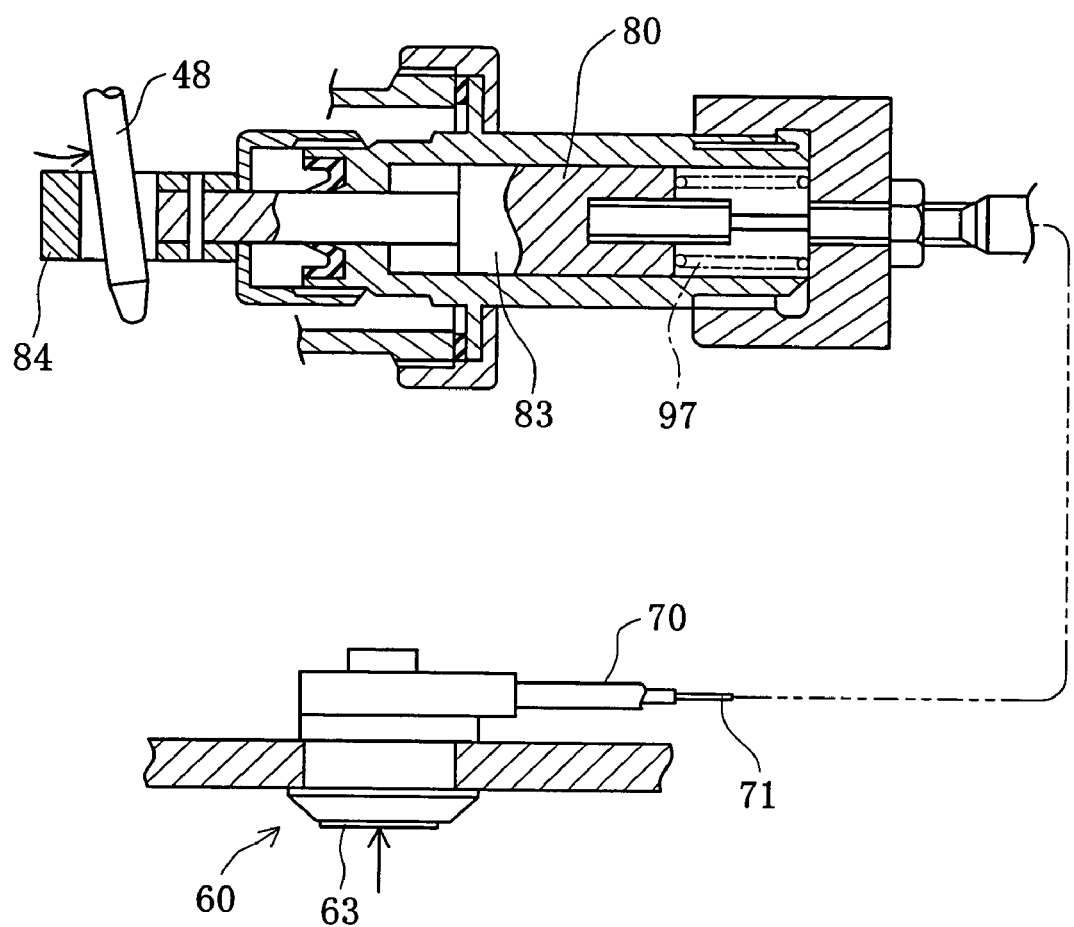
FIG. 7 shows an operation of the manual operation unit.

The clamp 91 is screwed to a side opening 28a of the casing 28 via the gasket 92 and holds the joint cylinder 93 in an extended manner. The gasket 92 is held between a flange 90a extended from the outer circumference of the support structure 90 and an end of the side opening 28a. The joint cylinder 93 has a connection aperture 93a, which receives the plunger 83 fitted therein in a slidable manner. The outer cap 94 is screwed to one end of the joint cylinder 93, while the inner cap 95 is screwed to the other end of the joint cylinder 93. The outer cap 94 has an aperture 94a to receive the outer cable 72 passing therethrough and fixes one end of the outer cable 72 with a nut 94b. The inner cap 95 has an aperture 95a to receive the plunger 83 passing therethrough. The gasket 96 is located in the inner cap 95 to seal the plunger 83 from the inner cap 95. The spring 97 is disposed in the connection aperture 93a formed in the joint cylinder 93. The spring 97 is spanned between the outer cap 94 and the plunger 83 to press the plunger 83 to a non-washing position. In response to a press of the operation button 63 to pull the inner cable 71, this structure of the coupling mechanism 80 causes the plunger 83 and the engagement ring 84 to move against the pressing force of the spring 97 and thereby incline the driving rod 48 as shown in FIG. 7. When the pressing force applied to the operation button 63 is released, on the contrary, the plunger 83 and the engagement ring 84 are returned to the original position shown in FIG. 3 by the pressing force of the spring 97.

The flush valve device 20 carries out a series of washing operations as discussed below. In the flush valve device 20, in response to a press of the operation button 63, the pressing operational force is transmitted via the cable mechanism 70 to the engagement ring 84 of the flush valve body 22 shown in FIG. 2. The movement of the engagement ring 84 inclines the driving rod 48 and thereby the pilot valve 40 integrally.

The inclination of the pilot valve 40 opens the communication path 42, so that the water in the back pressure chamber 36 is flown through the communication path 42 into the secondary water conduit 30B to lower the water pressure in the back pressure chamber 36. The water supply pressure in the main water conduit 30 presses the main valve 32 upward in FIG. 2 to open the main water conduit 30. A supply of washing water is accordingly flown into the toilet body 12 to wash the bowl section 12a.

During the washing of the bowl section 12a, the water in the main water conduit 30 is flown into the back pressure chamber 36 through a small aperture 45 formed in the side face of the main valve 32 to gradually heighten the water pressure in the back pressure chamber 36. The heightened water pressure in the back pressure chamber 36 results in closing the main valve 32 again to stop the supply of washing water.

The flush valve device 20 of this embodiment converts the pressing force of the operation button 63 into the tensile force of pulling the inner cable 71 and thereby inclines the driving rod 48 of the flush valve body 22. Since the operational stroke of the operation button 63 is all converted into the force in the direction of pulling the inner cable 71, the driving rod 48 can be inclined with a little force. This arrangement enables even an aged person or a person with little power to readily operate the flush valve device 20 by a soft touch and ensures the good operability.

Conversion of the pressing force generated by the pressing operation of the operation button 63 into the tensile force of pulling the inner cable 71 by means of the button unit 60 enables the thin flexible inner cable 71 to be laid out over a long distance without causing any buckle. The operation button 63 may thus be located at a position apart from the flush valve body 22. This desirably increases the degree of freedom in positioning of the operation button 63. For example, the operation button 63 may be located on a lateral side of the flush toilet 10. This arrangement enables the user to wash the flush toilet 10 without turning around, thus ensuring the enhanced operability.

The means for activating the washing operation is the push-type operation button 63. The operating element 63a of the operation button 63 is extended only slightly from the bathroom wall, while the conventional operating lever is extended to a significant height. This structure prevents the operation button 63 from being readily damaged due to frequent, rough actions.

The flush valve device 20, except the operation button 63 of the button unit 60, is concealed in the cabinet 18 or in the bathroom wall. This arrangement effectively prevents the untidiness in the periphery of the flush toilet 10 and ensures the favorable appearance of the flush toilet 10 and its periphery.

B. Second Embodiment

Figure 8:
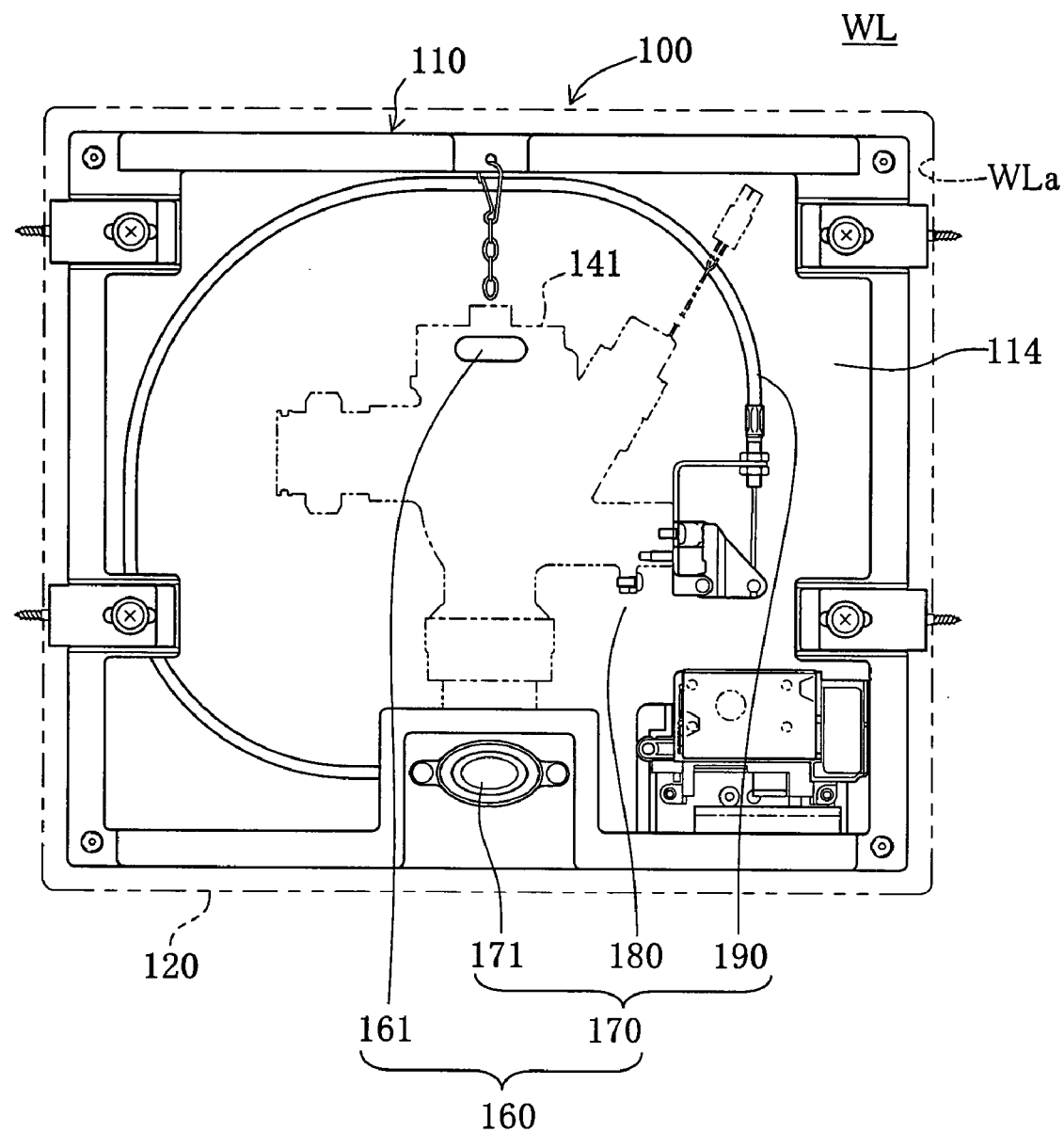
FIG. 8 is a front view illustrating a flush valve device 100 in a second embodiment.

FIG. 8 is a front view illustrating a flush valve device 100 in a second embodiment. The flush valve device 100 includes a wall fixation frame 110 that is attached to a fixation recess WLa formed in a bathroom wall WL (partition wall) and defines an inspection opening 114, a cover panel 120 that is detachably attached to a front face of the wall fixation frame 110, a flush valve body 141 that is disposed in a rear space of the bathroom wall WL, and a valve actuation unit 160 that functions to open and close the flush valve body 141. The valve actuation unit 160 has an auto water flow mechanism 161 activated by a built-in sensor and a manual operation unit 170 activated by manual operations. The manual operation unit 170 includes a button unit 171, a tilting mechanism 180, and a cable mechanism 190.

In response to a detection of a detachment action of the human body by the built-in sensor of the auto water flow mechanism 161, the flush valve body 141 is opened to flow a supply of washing water. In response to a manual operation of the button unit 171 of the manual operation unit 170, on the other hand, the tilting mechanism 180 is driven via the cable mechanism 190 to open the flush valve body 141 and flow a supply of washing water.

The flush valve body 141 and the valve actuation unit 160 are disposed in the inner space of the bathroom wall WL or attached to the wall fixation frame 110 and are readily accessible for maintenance only by removal of the cover panel 120. The respective constituents are discussed in detail:

(1) WALL FIXATION FRAME 110

Figure 9:
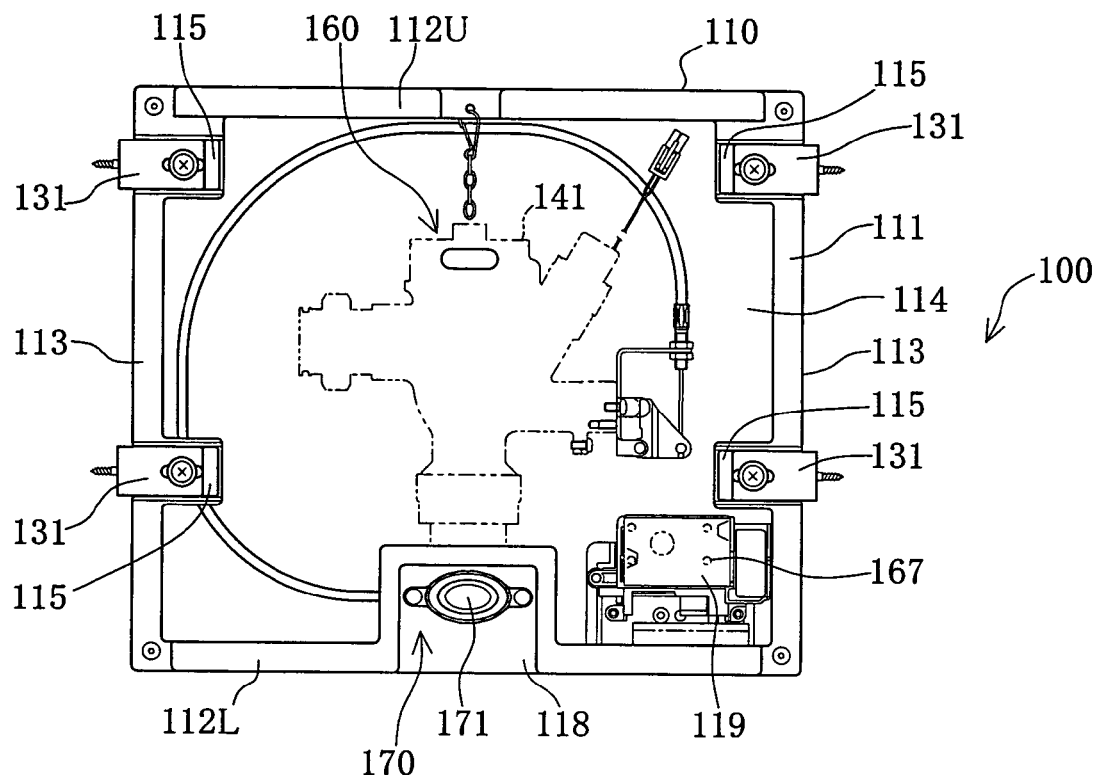
FIG. 9 is a front view illustrating the flush valve device 100 in a state of detachment of a cover panel 120.
Figure 9:
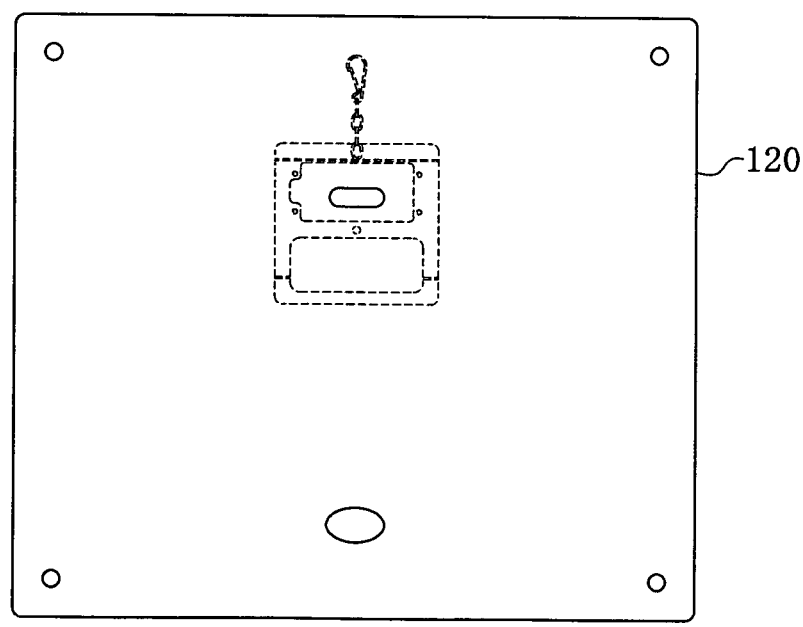

FIG. 9 is a front view illustrating the flush valve device 100 in the state of detachment of the cover panel 120. The wall fixation frame 110 is integrally made of a resin and has a rectangular frame assembly 111. The frame assembly 111 has a lower frame 112L, an upper frame 112U, and left and right vertical frames 113,113 to surround the inspection opening 114. The flush valve body 141 and the valve actuation unit 160 are located in the inner space of the inspection opening 114.

Figure 10:
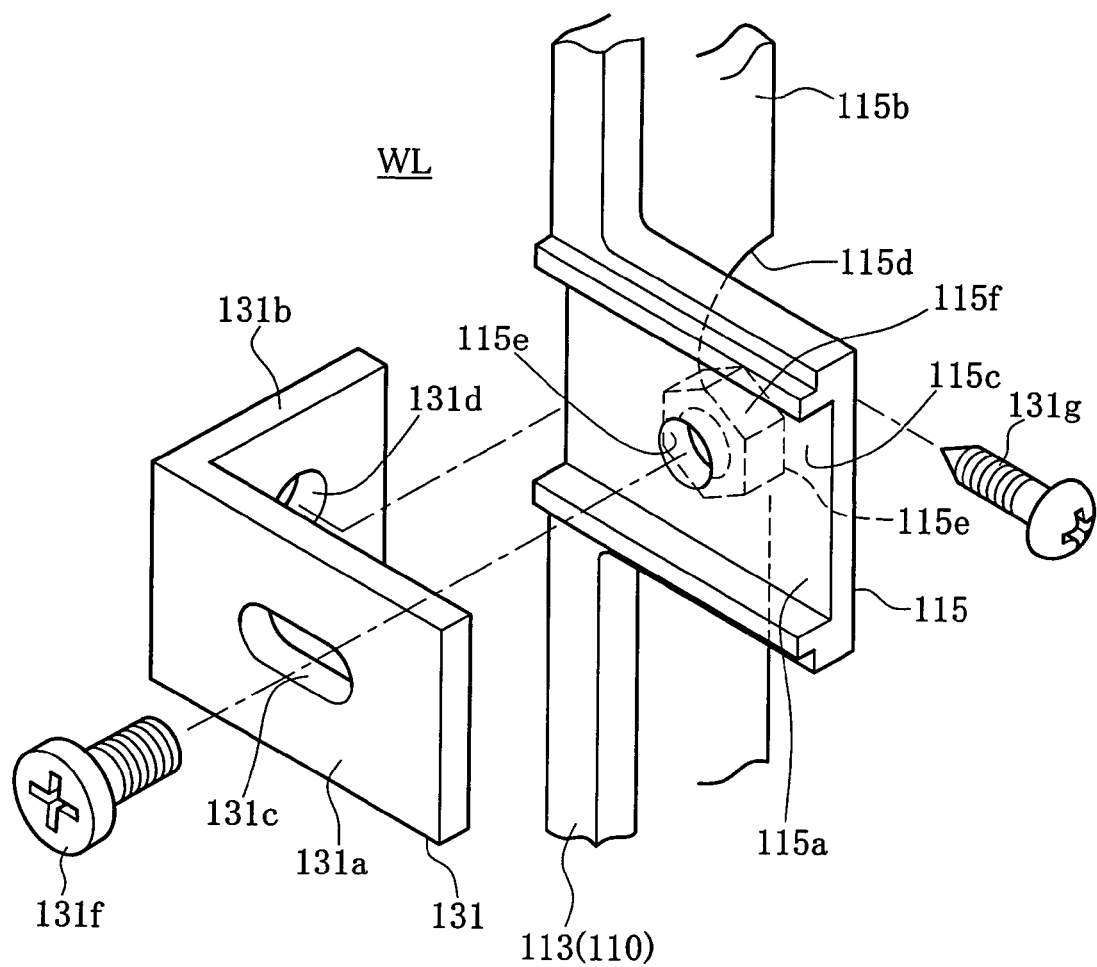
FIG. 10 is a perspective view illustrating a wall fixation frame 110 prior to attachment to a bathroom wall WL by means of frame clamps 131.

The wall fixation frame 110 is fixed to the bathroom wall WL with frame clamps 131 at four fixtures 115. FIG. 10 is a perspective view illustrating the wall fixation frame 110 prior to attachment to the bathroom wall WL by means of the frame clamps 131. Each of the fixtures 115 has a front fixture element 115a protruded from the vertical frame 113 toward the center of the wall fixation frame 110 and a side fixture element 115b extended from the base of the front fixture element 115a toward the side face of the vertical frame 113. A fixture recess 115c is formed in the front face of the front fixture element 115a to the side fixture element 115b to position the frame clamp 131. A notch 115d is formed on a lateral end of the side fixture element 115b. A nut receptor 115e is formed in the rear face of the front fixture element 115a to hold a nut 115f therein.

The frame clamp 131 has a front piece 131a and a side piece 131b to be formed in an L shape. A slot 131c is formed in the front piece 131a, and a circular aperture 131d is formed in the side piece 131b.

Figure 11A:
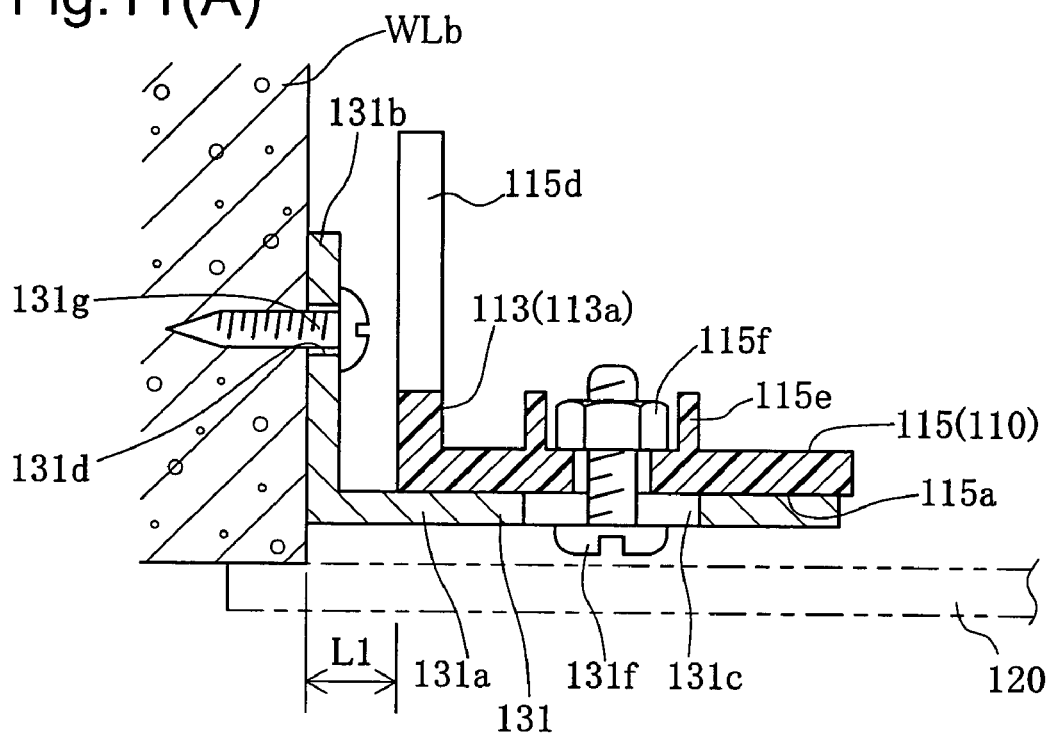
FIG. 11 is a sectional view illustrating the wall fixation frame 110 attached to a side wall WLb of the bathroom wall WL by means of the frame clamps 131.

FIG. 11 is a sectional view illustrating the wall fixation frame 110 attached to a side wall WLb of the bathroom wall WL by means of the frame clamps 131. As shown in FIG. 11(A), the procedure of attaching the wall fixation frame 110 to the bathroom wall WL sets the frame clamp 131 in the fixture recess 115c of the fixture 115 and temporarily and loosely holds a screw 131f with the nut 115f in the slot 131c. The procedure then drives another screw 131g into the circular aperture 131d, so as to fix the frame clamp 131 to the side wall WLb. Since the notch 115d is formed in a side wall 113a of the vertical frame 113, the screw 131g does not excessively press the side wall 113a but makes the fixture 115 directly pressed against the bathroom wall WL. Here the frame clamp 131 is temporarily held with the screw 131f and is movable along the slot 131c to an optimum position. The screw 131f is tightened when the frame clamp 131 comes into close contact with the side wall WLb.

Figure 11B:
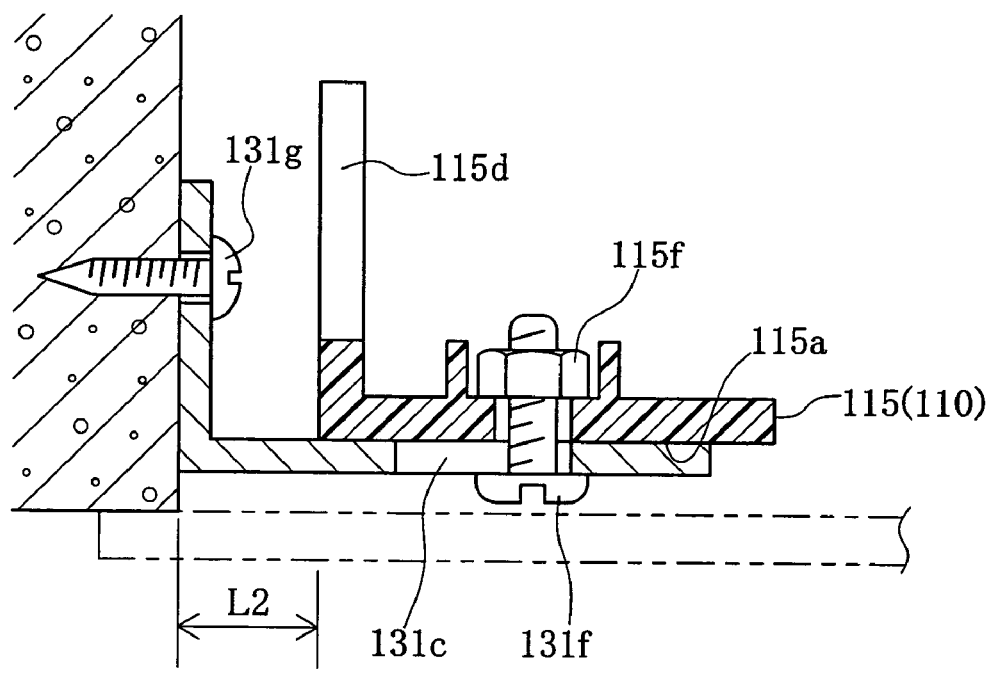

In the example of FIG. 11(B), the distance between the wall fixation frame 110 and the side wall WLb is expanded from L1 in FIG. 11(A) to L2, due to a dimensional error of the wall fixation frame 110 and a working error of the bathroom wall WL. Even in such a case, the frame clamp 131 can be attached closely to the side wall WLb by sliding the frame clamp 131 relative to the wall fixation frame 110 and changing the fastening position of the screw 131f along the slot 131c. Even if the bathroom wall WL has some working error, the wall fixation frame 110 made of resin is not damaged by application of an excessive force in the course of attachment.

As shown in FIG. 9, a button mounting bracket 118 and a battery mounting bracket 119 are disposed on the lower portion of the wall fixation frame 110. The button unit 171 of the manual operation unit 170 is mounted on the button mounting bracket 118, and a battery box 167 is detachably mounted on the battery mounting bracket 119. The structures of the button mounting bracket 118 and the battery mounting bracket 119, as well as those of the manual operation unit 170 and the battery box 167 will be discussed later.

(2) STRUCTURE AND ATTACHMENT OF COVER PANEL 120

Figure 12:
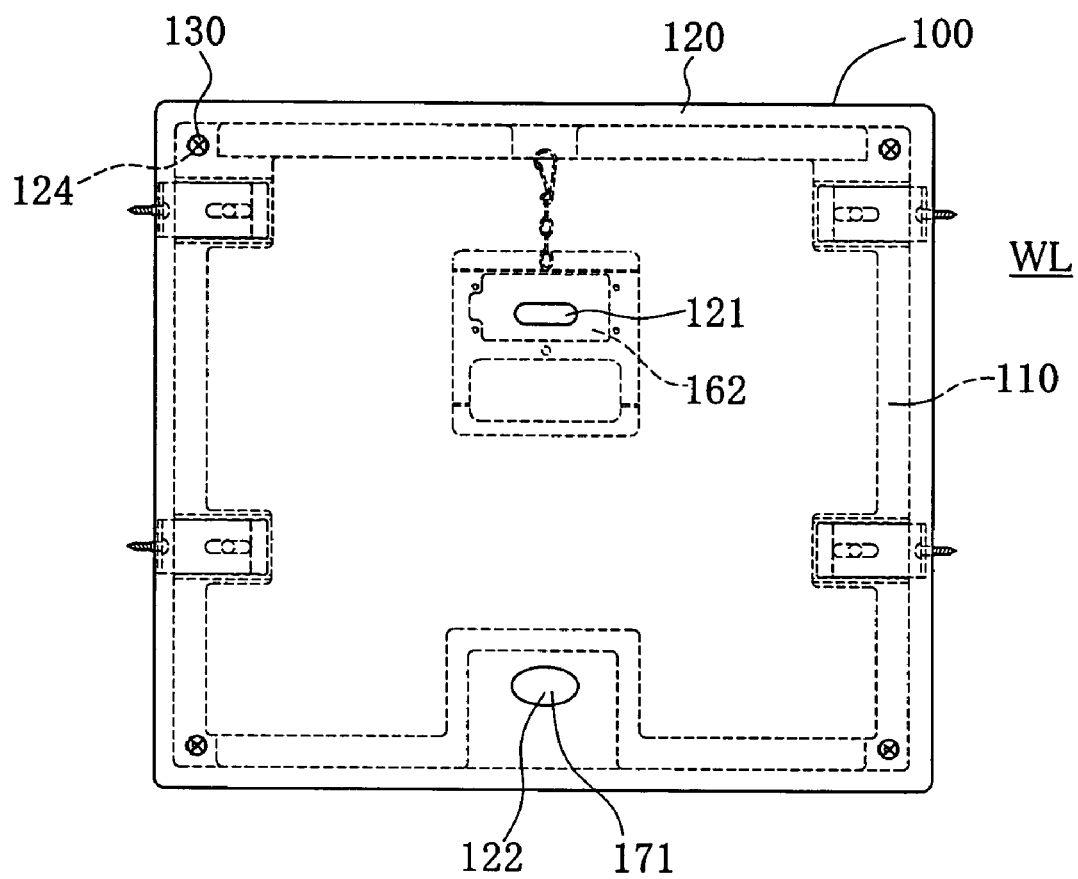
FIG. 12 is a front view illustrating the flush valve device 100.

FIG. 12 is a front view illustrating the flush valve device 100. The cover panel 120 is a stainless steel plate and is attached to the wall fixation frame 110 to be in plane with the bathroom wall WL. The cover panel 120 has a sensor opening 121 to receive a body detection sensor 162 set therein and a button opening 122 to allow access to the button unit 171.

The cover panel 120 is attached to four corners of the wall fixation frame 110 by means of Phillips head screws 130, each passing through a screwed through hole 124. The Phillips head screws 130 are in plane with the surface of the cover panel 120 to ensure the good design effects.

Figure 13:
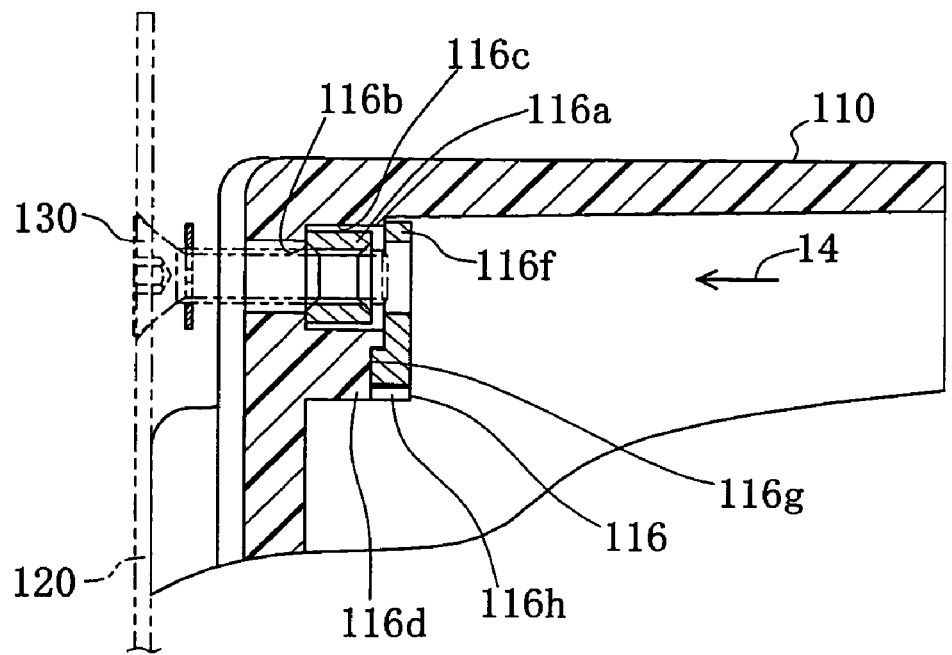
FIG. 13 is a sectional view illustrating a cover panel 120 fixed to a nut fixation assembly 116 by means of Phillips head screws 130.
Figure 14:
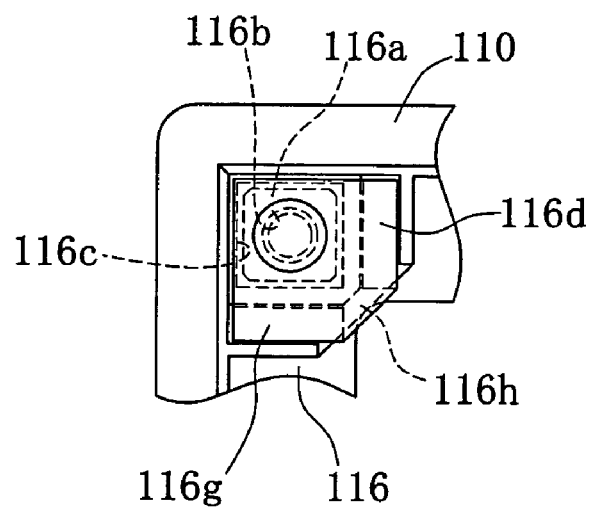
FIG. 14 is a view seen from the direction of an arrow 14 in FIG. 13.

FIG. 13 is a sectional view illustrating the cover panel 120 fixed to a nut fixation assembly 116 by means of the Phillips head screws 130. FIG. 14 is a view seen from the direction of an arrow 14 in FIG. 13. Each of the Phillips head screws 130 is fastened with a nut 116a received in the nut fixation assembly 116. The nut fixation assembly 116 is constructed as discussed below to facilitate attachment of the cover panel 120 even when the wall fixation frame 110 has some dimensional error due to shrinkage of the resin.

The nut fixation assembly 116 includes a support wall 116d to define a nut recess 116c to receive the nut 116a set therein and a sealing cover 116f. The nut recess 116c is formed as a space for receiving the nut 116a therein with a slightly movable allowance. A recess 116g to be filled with an adhesive is formed in an opening face of the support wall 116d. A notch 116h is formed at an outer corner of the support wall 116d to be extended from the recess 116g.

The nut 116a is set in the nut recess 116c, and the sealing cover 116f is bonded via the adhesive in the recess 116g. This structure effectively prevents the nut 116a from dropping off the cover panel 120. The presence of the notch 116h formed in the support wall 116d causes the adhesive in the recess 116g not to enter the nut recess 116c but to be flown out through the recess 116g. The nut 116a is accordingly neither made unmovable nor fixed at an undesirable position by the adhesive. The nut 116a has an opening taper 116b of an increasing diameter to facilitate insertion of the Phillips head screw 130. The opening taper 116b forms a slope to guide the end of the nut 116a, which is movable in the nut recess 116c.

In this structure of the nut fixation assembly 116, the nut 116a is received in the nut recess 116c with some allowance, so that nut 116a is movable in the nut recess 116c prior to fastening of the Phillips head screw 130 with the nut 116a. Even if the wall fixation frame 110 has a significant dimensional error due to shrinkage of the resin, the structure of the nut fixation assembly 116 desirably absorbs the dimensional error and facilitates positioning of the nut fixation assembly 116 relative to the screwed through hole 124 of the metal cover panel 120.

Figure 15:
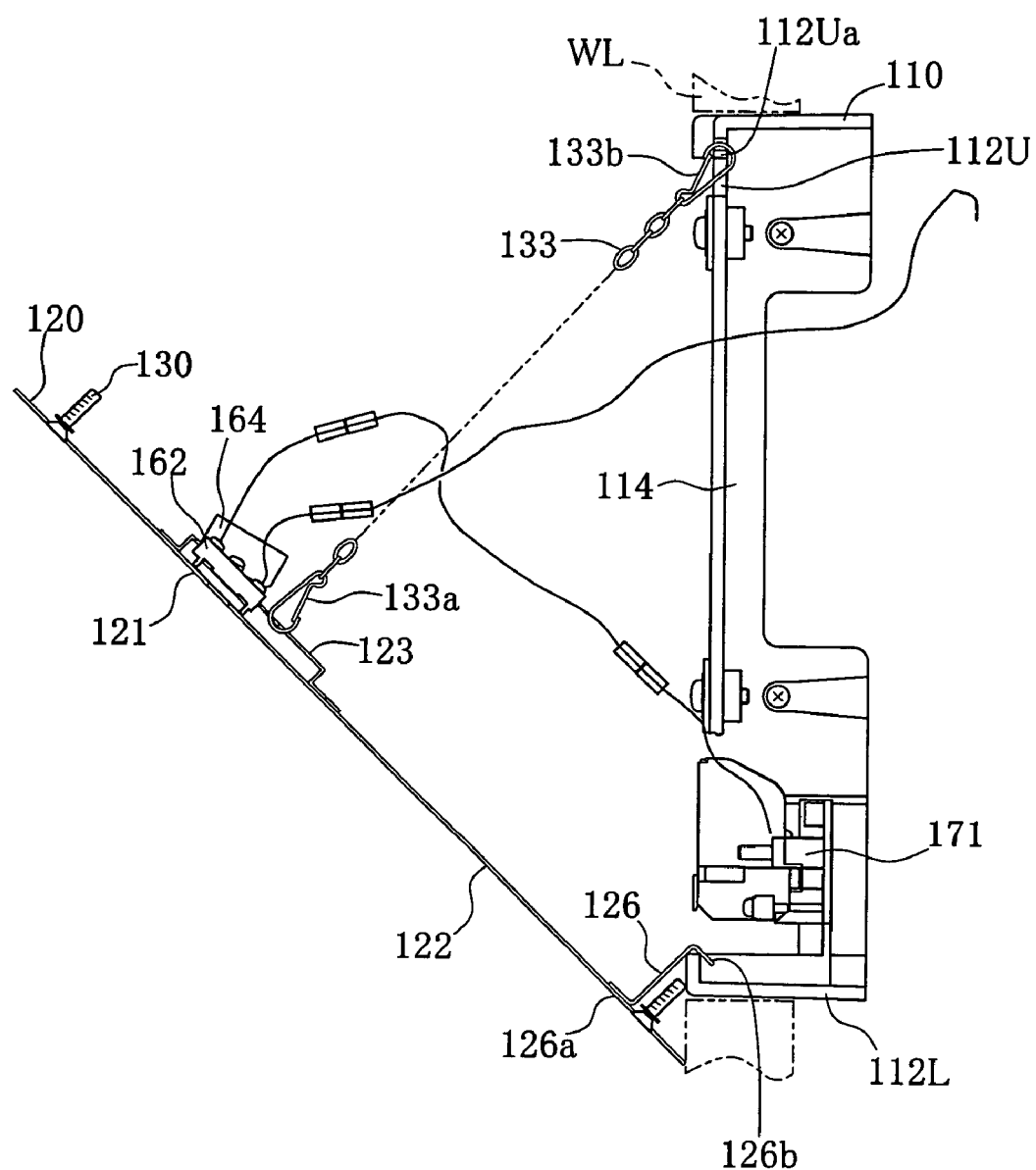
FIG. 15 is a side view illustrating the cover panel 120 in its open position.

FIG. 15 is a side view illustrating the cover panel 120 in its open position. The cover panel 120 is temporarily held on the wall fixation frame 110 by panel stoppers 126,126 and a chain 133. The panel stoppers 126,126 are mounted on both sides in the lower portion of the rear face of the cover panel 120. Each of the panel stoppers 126 has a base 126a welded to the rear face of the cover panel 120 and a catch 126b extended from the base 126a to an L shape. The end of the catch 126b is hooked on the lower frame 112L.

The chain 133 is hooked in a chain mounting bracket 123 attached to the rear race of the cover panel 120 with a clip 133a on one end thereof, while being hooked in a mounting hole 112Ua on the upper portion of the wall fixation frame 110 with a clip 133b on the other side.

The cover panel 120 is thus supported on its lower portion by the panel stoppers 126 and is hung by the chain 133, so as to be attached in an inclined state to the wall fixation frame 110.

(3) STRUCTURE AND OPERATIONS OF FLUSH VALVE BODY 141

Figure 16:
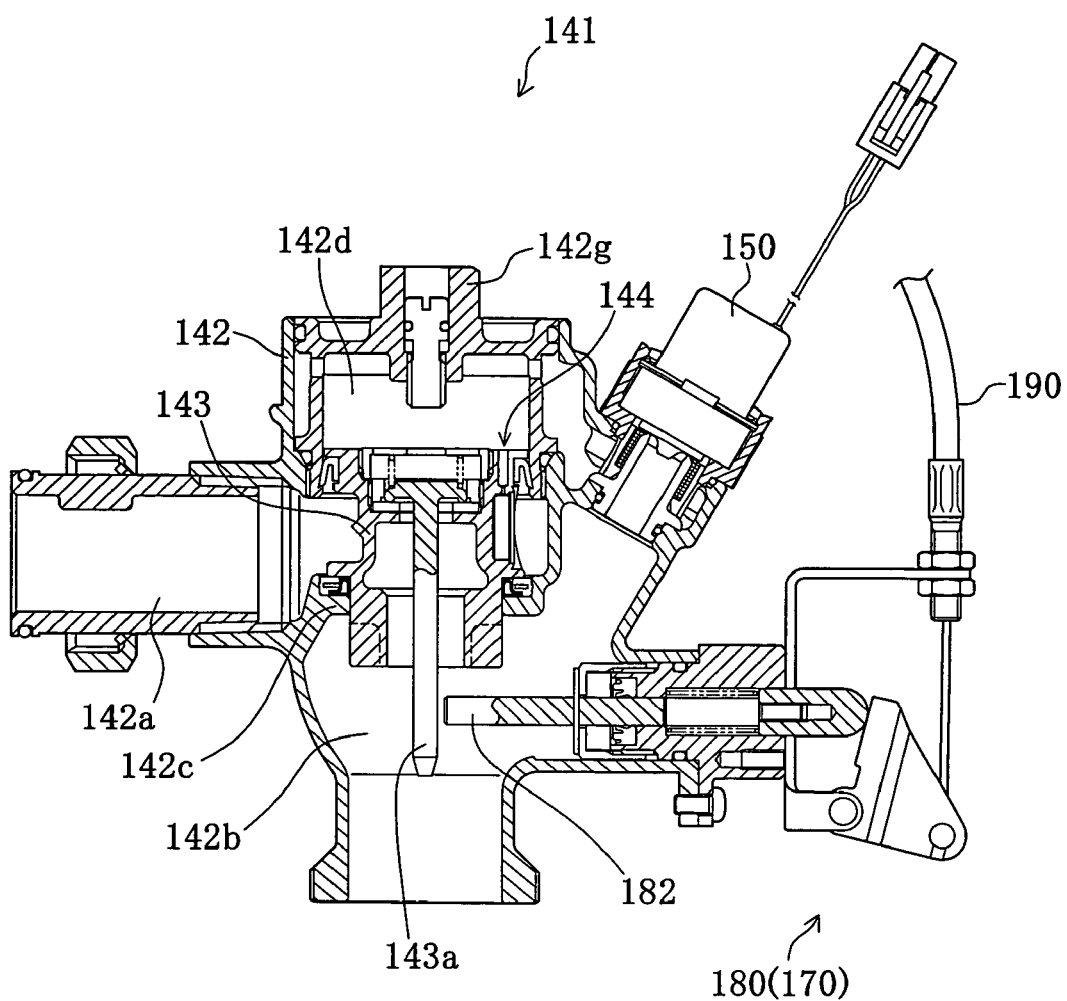
FIG. 16 is a sectional view illustrating a flush valve body 141.

FIG. 16 is a sectional view illustrating the flush valve body 141. The flush valve body 141 has the construction mostly similar to that of the first embodiment, except that the flush valve body 141 has an on-off solenoid valve 150, in addition to a structure driven by the manual operation unit 170. The flush valve body 141 has a main valve 143 that is disposed in a casing 142 and is seated on and released from a valve seat 142c formed between a primary water conduit 142a and a secondary water conduit 142b, a pilot valve 144 that regulates water in a back pressure chamber 142d parted by the main valve 143, and the on-off solenoid valve 150 attached to an upper lateral side of the casing 142. The flow of water from the back pressure chamber 142d of the main valve 143 is supplied as washing water and stopped, in response to opening and closing operations of the on-off solenoid valve 150 or in response to an action of inclining a driving rod 143a of the main valve 143 and an action of restoring the driving rod 143a to its upright position. A filter (not shown) is disposed in the primary water conduit 142a of the flush valve body 141 and is accessible for maintenance by detachment of a cover member 142g of the casing 142, the main valve 143, and the pilot valve 144.

Figure 17:
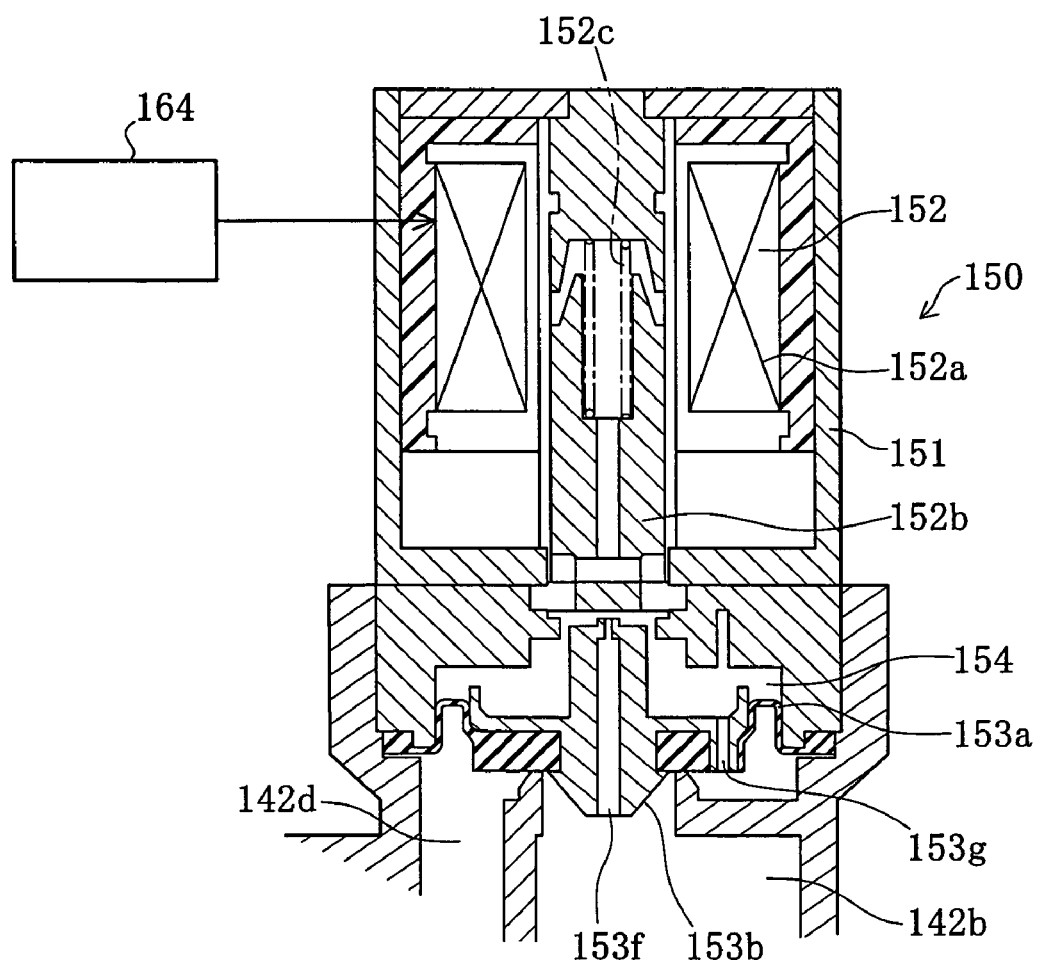
FIG. 17 is a sectional view illustrating an on-off solenoid valve 150

FIG. 17 is a sectional view illustrating the on-off solenoid valve 150. The on-off solenoid valve 150 is received in a casing 151 and includes an actuation module 152 and a diaphragm valve plug 153. The actuation module 152 has a magnet coil 152a, a plunger 152b driven up and down by excitation of the magnet coil 152a, and a spring 152c pressing the plunger 152b downward in the drawing. The diaphragm valve plug 153 has a diaphragm 153a fixed on one end of the casing 151 and a diaphragm support element 153b supporting a central portion of the diaphragm 153a, and defines a pressure chamber 154. A communication hole 153f is formed at the center of the diaphragm support element 153b to communicate the pressure chamber 154 with the secondary water conduit 142b. One opening of the communication hole 153f is arranged to be opened and closed by an end of the plunger 152b. A small aperture 153g is formed in an outer periphery of the diaphragm 153a to connect the pressure chamber 154 with the back pressure chamber 142d of the flush valve body 141.

The opening and closing operations of the on-off solenoid valve 150 are described. When an opening signal is transmitted to the actuation module 152, the plunger 152b is driven up against the pressing force of the spring 152c. The water in the pressure chamber 154 then flows out through the communication hole 153f of the diaphragm support element 153b, so that the diaphragm 153a is lifted up by the water pressure from the back pressure chamber 142d of the flush valve body 141. The water in the back pressure chamber 142d of the flush valve body 141 is accordingly drained to the secondary water conduit 142b. Drainage of the water in the back pressure chamber 142d results in opening the flush valve body 141 shown in FIG. 16. When a closing signal is transmitted from a valve driving circuit 164 to the actuation module 152, on the contrary, the plunger 152b of the actuation module 152 is driven down to reduce the flow path area of the communication hole 153f. The inner pressure of the pressure chamber 154 then gradually increases to lower the diaphragm valve plug 153. When the pressures applied on both faces of the diaphragm 153a are balanced, the diaphragm valve plug 153 is shut to heighten the pressure in the back pressure chamber 142d. This closes the flush valve body 141.

(4) VALVE ACTUATION UNIT 160

As shown in FIG. 8, the valve actuation unit 160 includes the auto water flow mechanism 161 and the manual operation unit 170.

(4)-A. Auto Water Flow Mechanism 161

Figure 18:
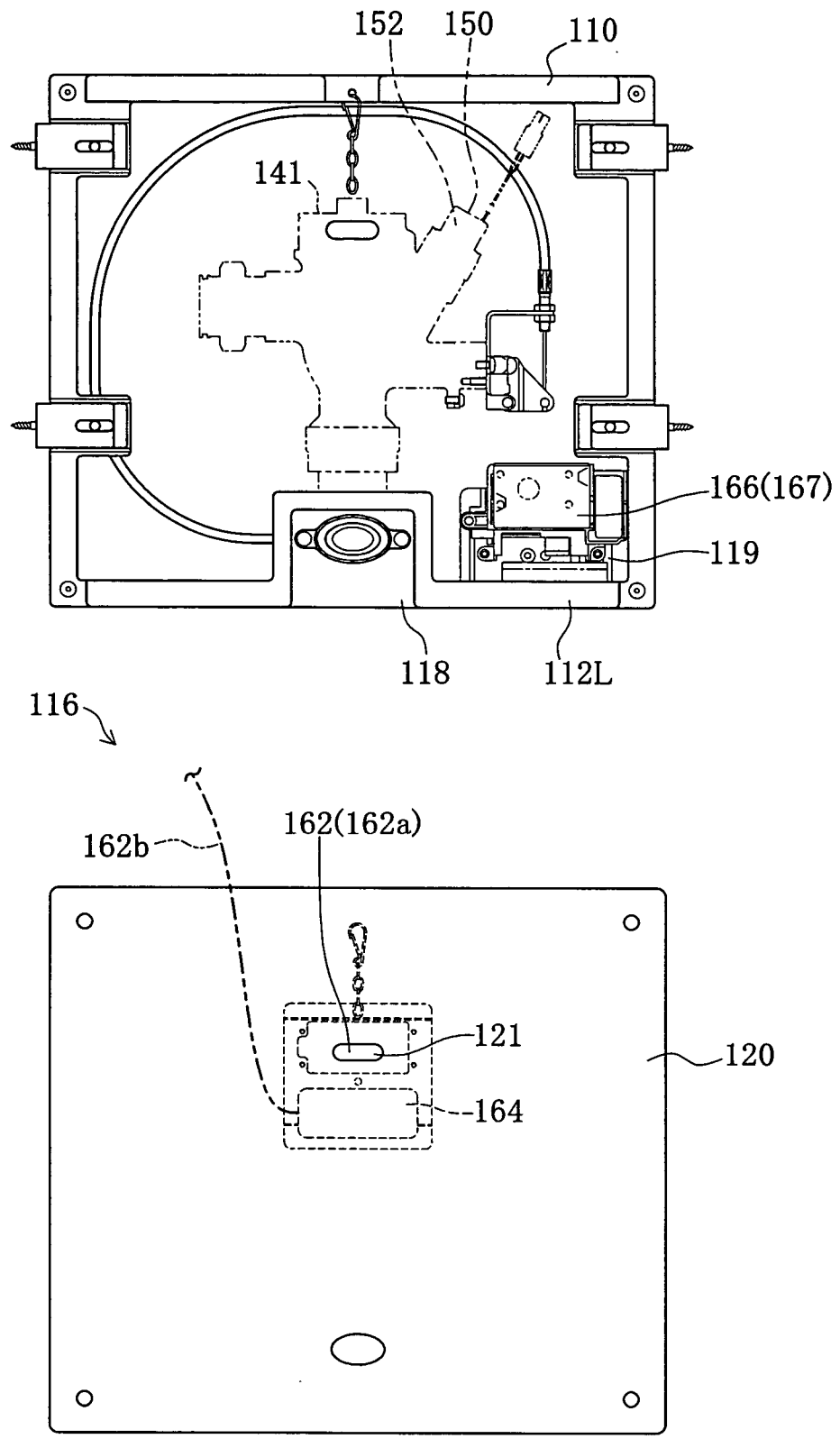
FIG. 18 shows an auto water flow mechanism 161 attached to an upper rear face of the cover panel 120.

FIG. 18 shows the auto water flow mechanism 161 attached to the upper rear face of the cover panel 120. The auto water flow mechanism 161 includes the body detection sensor 162, a valve driving circuit 164 integrated with the body detection sensor 162, and a power source 166 supplying electric power to the body detection sensor 162 and the valve driving circuit 164. The body detection sensor 162 is attached to the rear face of the cover panel 120 and has a sensing plane 162a exposed to the sensor opening 121. The sensing plane 162a is arranged in a suitable direction for sensing the body. A detection signal of the body detection sensor 162 is transmitted to the valve driving circuit 164 and is then sent from the valve driving circuit 164 to the actuation module 152 of the on-off solenoid valve 150 via a lead 162b. The power source 166 has the battery box 167 to receive four AA batteries therein. The battery box 167 is detachably mounted on the battery mounting bracket 119.

(4)-B1. Manual Operation Unit 170

Figure 19:
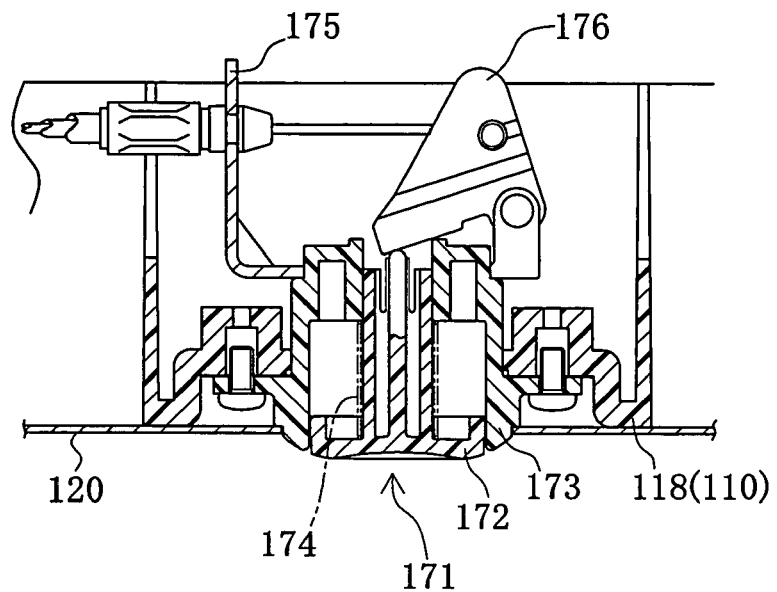
FIG. 19 is a horizontal sectional view illustrating the periphery of a button unit of a manual operation unit.
Figure 20:
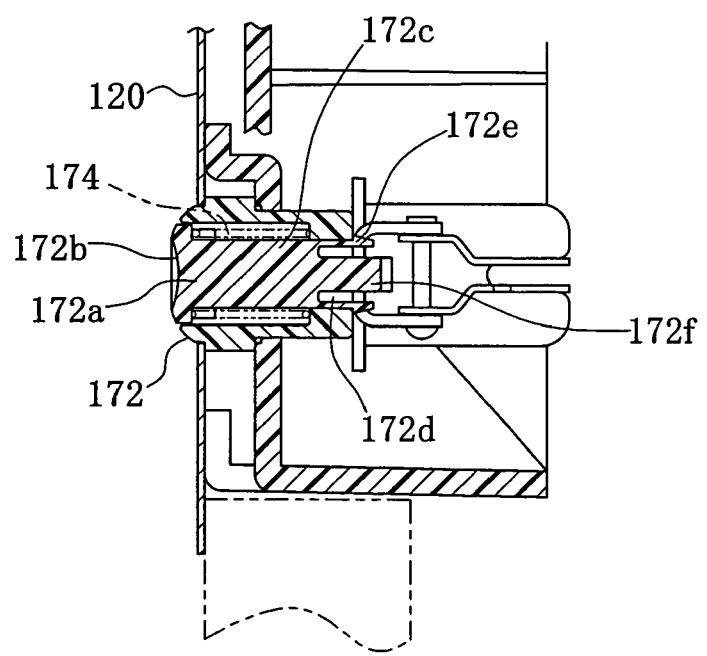
FIG. 20 is a vertical sectional view illustrating the button unit.
Figure 21:
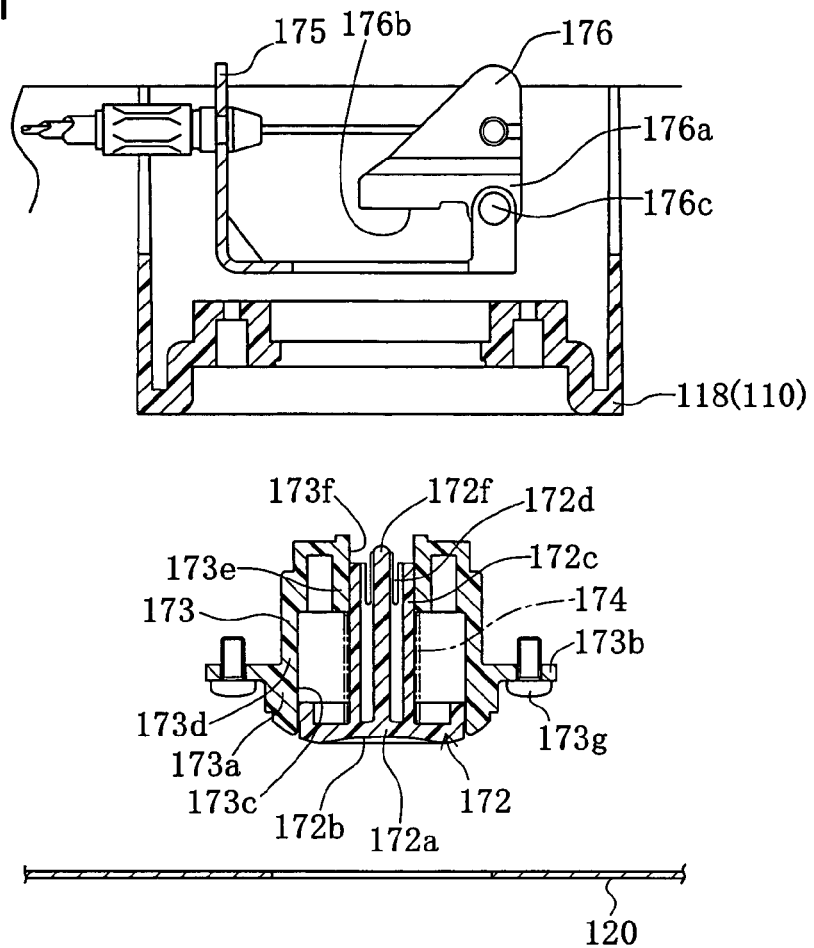
FIG. 21 is a sectional view showing the button unit of FIG. 19 prior to attachment to a button mounting bracket 118.
Figure 22:
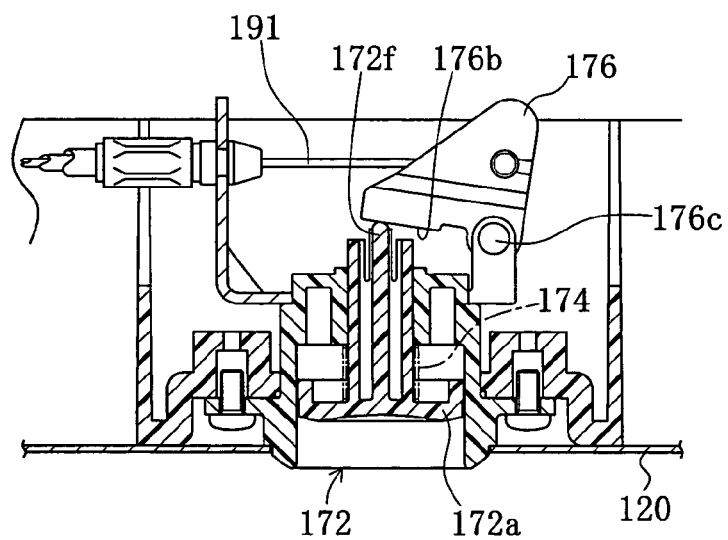
FIG. 22 is a sectional view showing the button unit of FIG. 19 in a pressed state.

FIG. 19 is a horizontal sectional view illustrating the periphery of the button unit 171 of the manual operation unit 170. FIG. 20 is a vertical sectional view illustrating the button unit 171. FIG. 21 is a sectional view showing the button unit 171 of FIG. 19 prior to attachment to the button mounting bracket 118. FIG. 22 is a sectional view showing the button unit 171 of FIG. 19 in a pressed state. As shown in FIG. 19, the button unit 171 is mounted on the button mounting bracket 118 of the wall fixation frame 110 and includes an operation button 172, a button support member 173, a spring 174, a support fitting 175, and a rotary member 176.

As shown in FIG. 21, the operation button 172 has an elliptical operating element 172a having an outer surface functioning as an operating face 172b. The operating element 172a is formed in a long oval shape to ensure the good design effects, and has a concave curve around the shape of a finger to ensure the favorable operability. A cylindrical projection 172c is protruded from the rear face of the operating element 172a. A slit 172d and a catch 172e (see FIG. 20) are formed on the end of the cylindrical projection 172c. A center pressing element 172f is protruded from the center of the rear face of the operating element 127a to pass through the cylindrical projection 172c.

The button support member 173 is mounted on the button mounting bracket 118 of the wall fixation frame 110, supports the operation button 172 in such a manner as to allow a pressing operation, and has a guide body 173a. The guide body 173a has a flange 173b formed around its outer circumference and is fixed to the button mounting bracket 118 by means of fixing screws 173g. A sliding aperture 173c is formed in the guide body 173a to support the operating element 172a in a slidable manner. A guide element 173d is formed on the end of the button support member 173. The guide element 173d has a guide cylinder 173e with a guide aperture 173f, which guides the cylindrical projection 172c in a slidable manner. The cylindrical projection 172c contracts its diameter at the slit 172d and rides over the catch 172e, so as to be pressed into the guide aperture 173f and be supported in the guide aperture 173f in a slidable manner.

The spring 174 is spanned between the operating element 172a and the guide element 173d to press the operation button 172 in the protruding direction (forward). The operation button 172 pressed by the spring 174 is fastened to the button support member 173 by means of the catch 172e.

The support fitting 175 is an L-shaped fixture fixed to the end of the button support member 173 to support the rotary member 176 in a pivotally rotatable manner. The rotary member 176 has two substantially triangular plates, which face each other and are integrated with each other, and is attached on its base 176a to the support fitting 175 to be pivotally rotatable about a pivot 176c. One end of the rotary member 176 forms a pressure end 176b, which is pressed by the center pressing element 172f.

In the manual operation unit 170, a push of the operating element 172a of the operation button 172 presses in the operating element 172a against the pressing force of the spring 174, so as to make the end of the center pressing element 172f rotate the rotary member 176 about the pivot 176c.

As described previously, the manual operation unit 170 is mounted on the button mounting bracket 118 of the wall fixation frame 110. The button mounting bracket 118 is protruded upward from the center of the upper frame 112U and has a fixing aperture 118b for fixing the button support member 173. The fixing aperture 118b has multiple fixation projections 118c formed along the inner circumferential wall thereof. When the button support member 173 with the operation button 172 incorporated therein is inserted into the fixing aperture 118b, the multiple fixation projections 118c are pressed by the outer face of the button support member 173 and are elastically deformed, so that the button support member 173 is positioned on the button mounting bracket 118. The button support member 173 is fixed to the button mounting bracket 118 by means of the fixing screws 173g.

(4)-B2. Structure of Tilting Mechanism 180

Figure 23:
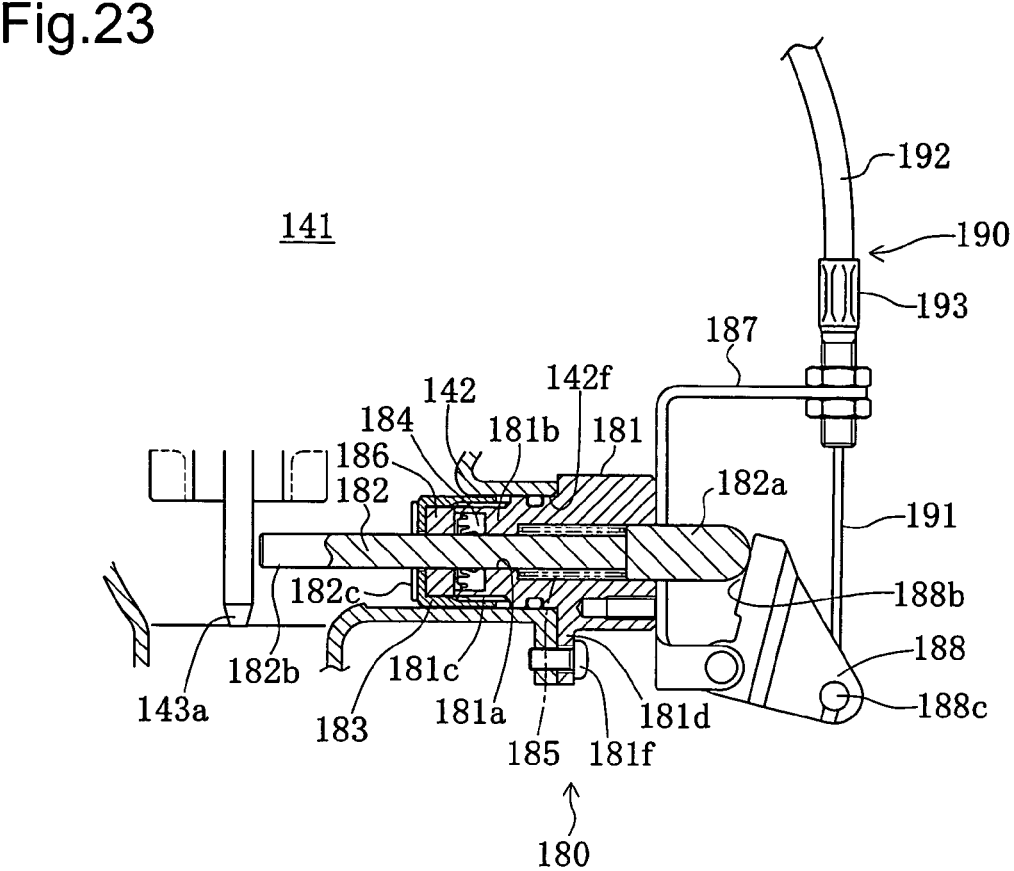
FIG. 23 is a sectional view illustrating a tilting mechanism and its periphery.
Figure 24:
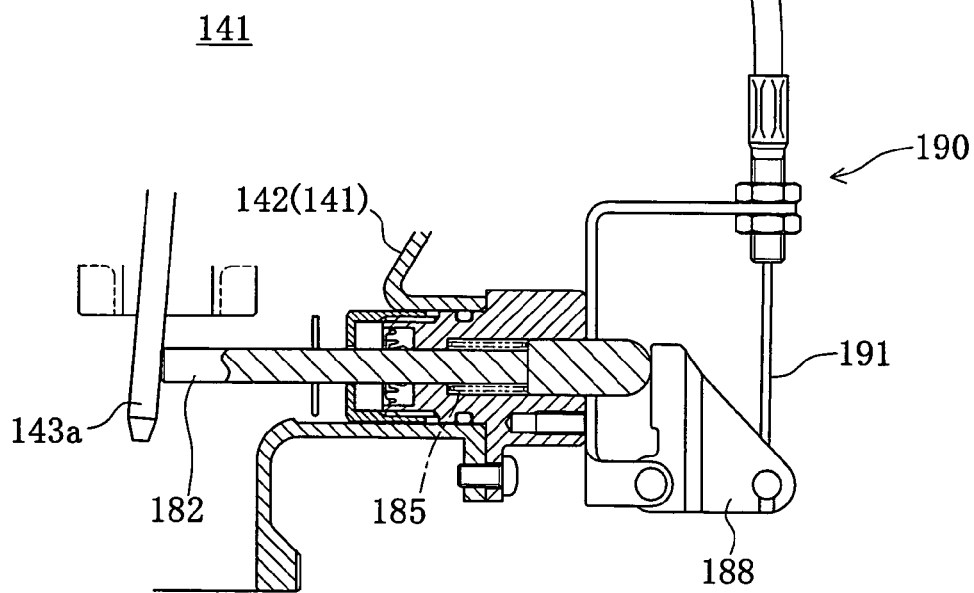
FIG. 24 is a sectional view illustrating the tilting mechanism in a pressed state.

FIG. 23 is a sectional view illustrating the tilting mechanism 180 and its periphery. FIG. 24 is a sectional view illustrating the tilting mechanism 180 in a pressed state. The tilting mechanism 180 includes a fitting member 181, a pressure bar 182, an inner cap 183, a gasket 184, a spring 185, a support member 186, a support fixture 187, and a rotating member 188.

The fitting member 181 is fixed to a side opening 142f of the casing 142 via an O ring for sealing. A flange 181d is fixed to the casing 142 by means of a fixation screw 181f, while an insertion fixation element 181b is inserted into the side opening 142f. A fitting through hole 181a is formed on the axial center of the fitting member 181, and the pressure bar 182 is set in the fitting through hole 181a in a slidable manner. The pressure bar 182 has a pressing element 182a and a driving element 182b, which are joined and integrated with each other by means of a screw. One end of the pressing element 182a, which comes into contact with the rotating member 188, is formed to have a hemispherical shape and convert the pressing force of the rotating member 188 into a moving force in the axial direction. One end of the driving element 182b is arranged to incline the driving rod 143a from its lateral side. A stopper pin 182c passes through the pressure bar 182 perpendicularly to its axial direction to fasten the pressure bar 182.

The inner cap 183 is set on a screwed element 181c to be attached to the insertion fixation element 181b of the fitting member 181. The gasket 184 is placed in the inner cap 183 and is held by the support member 186. The gasket 184 seals the outer circumferential face of the pressure bar 182.

The support fixture 187 and the rotating member 188 have the shapes similar to those of the support fitting 175 and the rotary member 176 shown in FIG. 19. The support fixture 187 is fixed to the periphery of the side opening 142f of the casing 142 and supports the rotating member 188 to be pivotally rotatable about a pivot 188c. One end of the rotating member 188 forms a pressure end 188b to press the pressure bar 182. Pivotal rotation of the rotating member 188 presses the pressure bar 182, which then moves against the pressing force of the spring 185 to open the flush valve body 141 as shown in FIG. 24.

(4)-B3. Structure of Cable Mechanism 190

The cable mechanism 190 includes an inner cable 191 and an outer cable 192. The inner cable 191 is made of a flexible wire and is set in the inspection opening 114 to surround the flush valve body 141. One end of the inner cable 191 is coupled with the rotary member 176 of the manual operation unit 170 shown in FIG. 19, and the other end is coupled with the rotating member 188 of the tilting mechanism 180 shown in FIG. 23. The two ends of the outer cable 192 are respectively fixed to the support fitting 175 and the support fixture 187 by means of cable fixing brackets 193,193.

(5) WASHING OPERATIONS

The following discusses washing operations. There are two different types of washing operations; automatic actuation of the flush valve body 141 by the body detection sensor 162 and manual actuation of the flush valve body 141 by the valve actuation unit 160, for example, in the case of malfunction of the body detection sensor 162.

(5)-A. Washing Operation by Body Detection Sensor 162

Referring to FIG. 18, when the body detection sensor 162 detects the human body, a detection signal is transmitted from the body detection sensor 162 to the valve driving circuit 164 and further to the actuation module 152 of the on-off solenoid valve 150. In response to the detection signal, the water in the back pressure chamber 142d of the flush valve body 141 is drained to open the flush valve body 141.

(5)-B. Manual Washing Operation

Referring to FIG. 19, a push of the operating element 172a of the operation button 172 presses in the operating element 172a against the pressing force of the spring 174 and makes the center pressing element 172f press the pressure end 176b of the rotary member 176. The rotary member 176 accordingly rotates about the pivot 176c to pull the inner cable 191 (the state of FIG. 22). When the inner cable 191 is pulled, the rotating member 188 of the tilting mechanism 180 rotates about the pivot 188c as shown in FIG. 24. The pressure end 188b of the rotating member 188 accordingly presses the pressure bar 182 against the pressing force of the spring 185. In response to the movement of the pressure bar 182, the driving element 182b presses the driving rod 143a of the flush valve body 141 to open the flush valve body 141.

(6) MAINTENANCE FLUSH VALVE DEVICE 100

For the purpose of maintenance of the flush valve device 100, the cover panel 120 is detached from the wall fixation frame 110 as shown in FIG. 9. The procedure takes off the Phillips head screws 130 and pulls the upper portion of the cover panel 120 down as shown in FIG. 15. Here the cover panel 120 is temporarily held through engagement of the panel stoppers 126,126 with the lower frame 112L. The procedure then disconnects the leads 162b and 164a at their connectors and lifts up the cover panel 120 to release the engagement of the panel stoppers 126, 126 with the lower frame 112L and thereby open the inspection opening 114. The flush valve body 141 shown in FIG. 9 is accessible through the inspection opening 114 for maintenance.

In the structure of the flush valve device 100, the manual operation unit 170 is fixed to the wall fixation unit 110. Maintenance is attained by removal of only the cover panel 120, while the manual operation unit 170 is coupled with the flush valve body 141. This arrangement ensures the good operability.

As shown in FIG. 16, the pressure bar 182 of the tilting mechanism 180 is located on the lateral side of the driving rod 143a across a preset interval. At the time of maintenance, for example, replacement or cleaning of the filter in the flush valve body 141, this structure enables the pilot valve 144 and the main valve 143 to be readily detached after removal of the cover member 142g of the flush valve body 141. No troublesome work like detachment and decomposition of the tilting mechanism 180 is required for the maintenance. This structure thus ensures the favorable operability.

(7) MODIFIED EXAMPLES OF TILTING MECHANISM

FIGS. 25 through 28 show three modified examples of the tilting mechanism. These modified structures of the tilting mechanism are applicable according to the structure of the flush valve body and the layout of the operation button.

(7)-1. Modified Example 1

Figure 25:
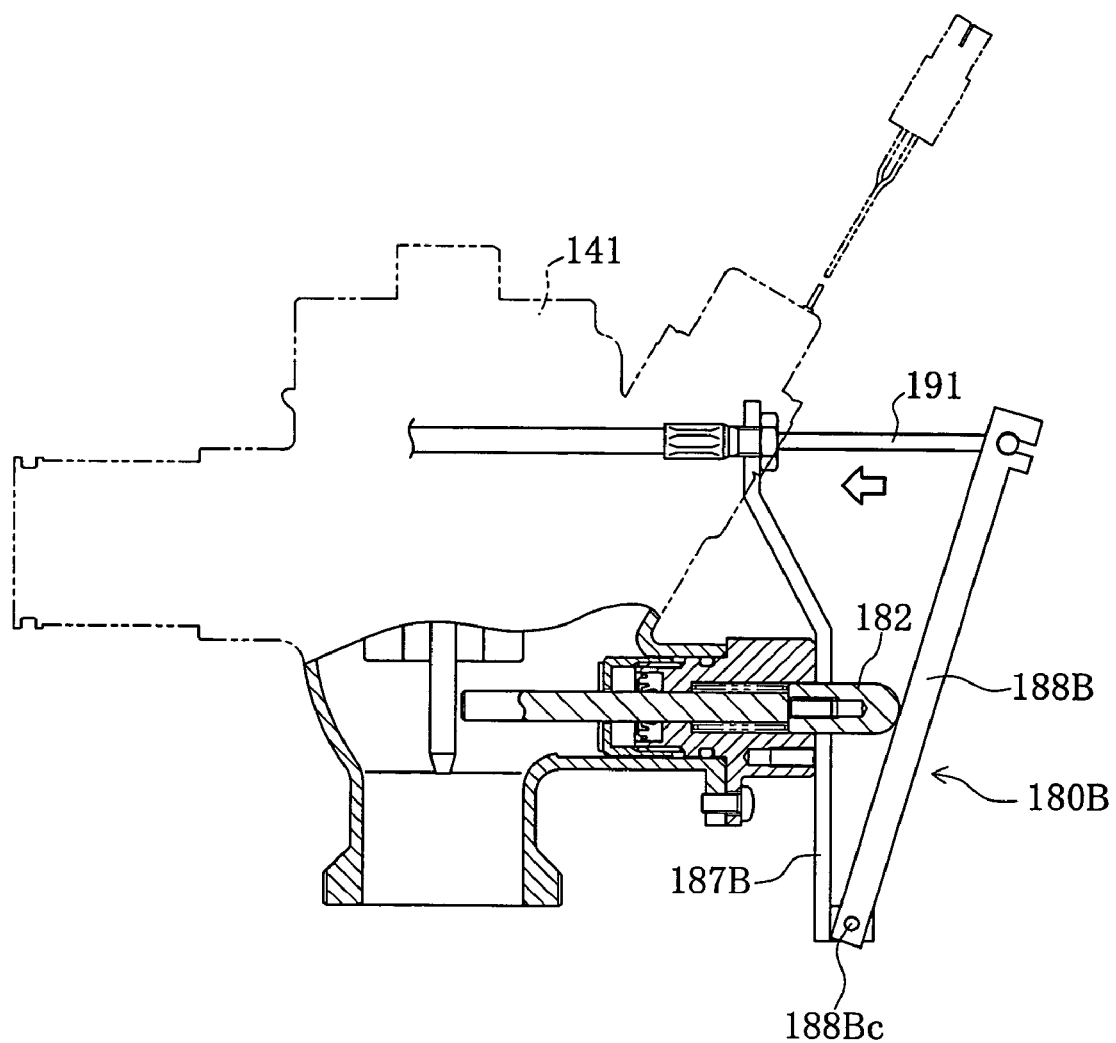
FIG. 25 is a sectional view illustrating another tilting mechanism 180B in a first modified example.

A tilting mechanism 180B shown in FIG. 25 includes a support fixture 187B and a pivot lever 188B (pressing force conversion member) supported on one end of the support fixture 187B in a pivotally rotatable manner. The inner cable 191 is linked with the other end of the pivot lever 188B. In response to a pull of the inner cable 191 in the direction of an open arrow, the pivot lever 188B rotates about a pivot 188Bc to press the pressure bar 182.

(7)-2. Modified Example 2

Figure 26:
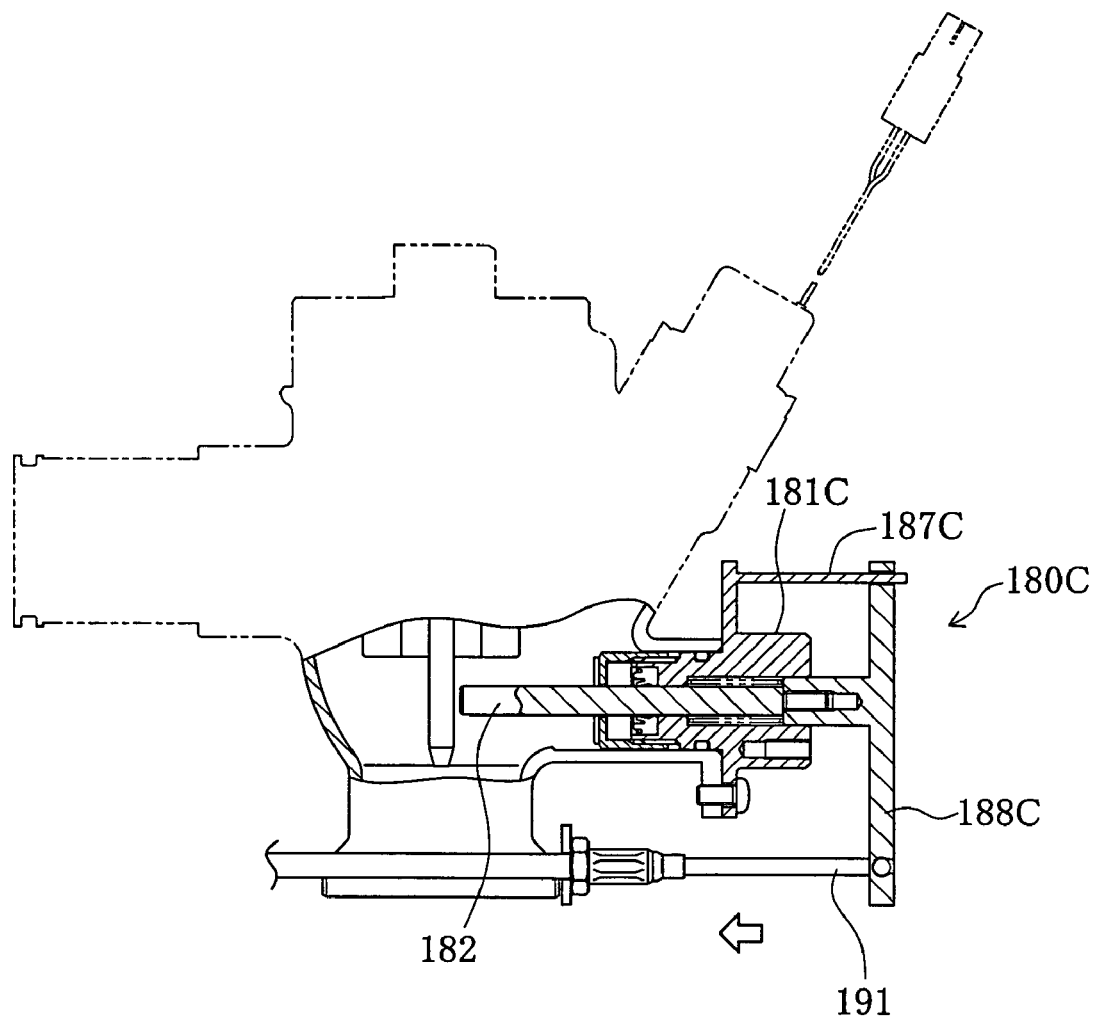
FIG. 26 is a sectional view illustrating still another tilting mechanism 180C in a second modified example.

A tilting mechanism 180C shown in FIG. 26 has a guide 187C protruded from a fitting member 181C and a coupling plate 188C. The guide 187C passes through one end of the disc-shaped coupling plate 188C, while the inner cable 191 is linked with the other end of the coupling plate 188C. In response to a pull of the inner cable 191 in the direction of an open arrow, the coupling plate 188C is guided along the guide 187C to press the pressure bar 182 while keeping the parallel attitude.

(7)-3. Modified Example 3

Figure 27:
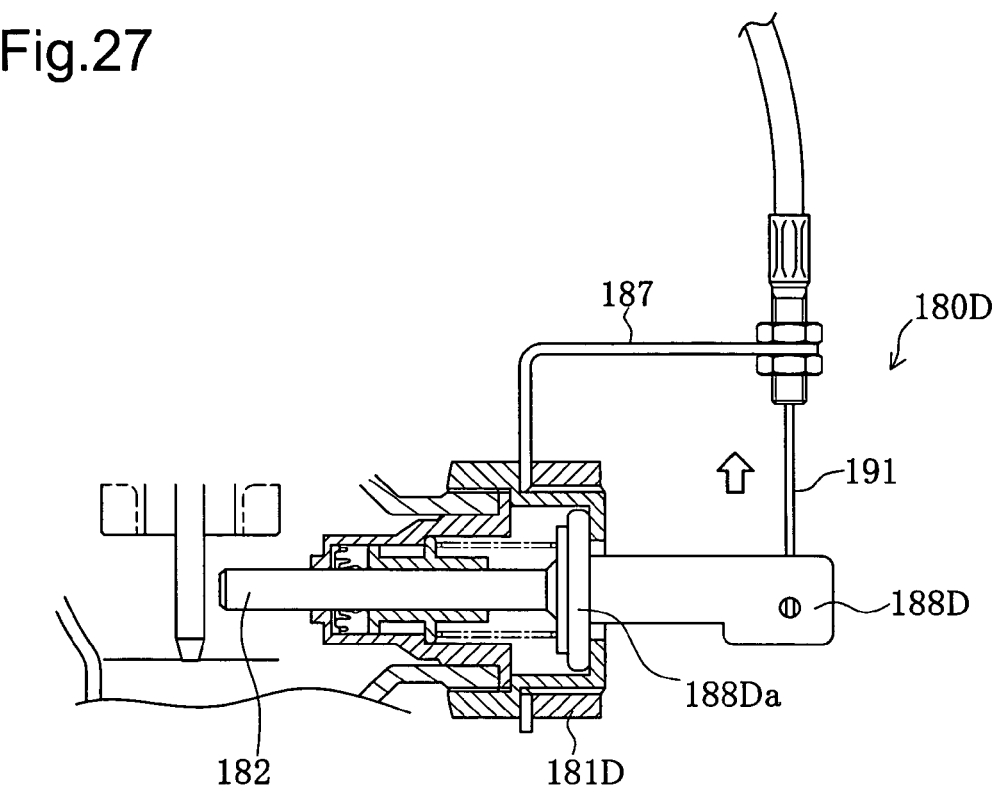
FIG. 27 is a sectional view illustrating another tilting mechanism 180D in a third modified example.
Figure 28:
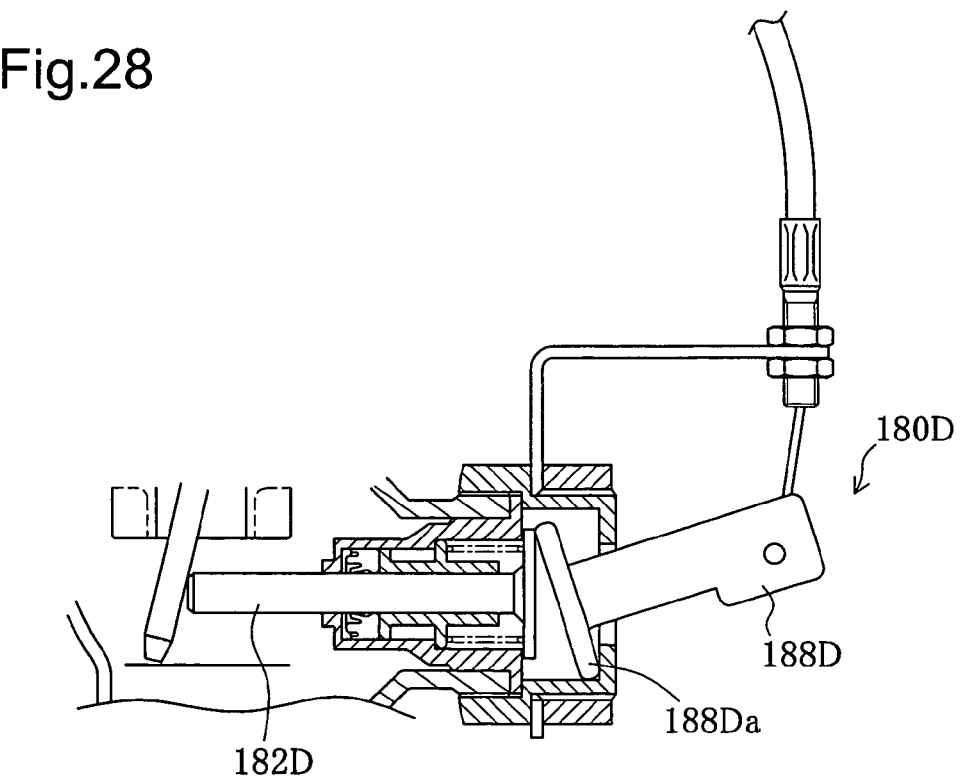
FIG. 28 shows an operation of the third modified example.

A tilting mechanism 180D shown in FIGS. 27 and 28 has a support fixture 187D and a swing lever 188D. The swing lever 188D has a base 188Da on one end, which is supported in a fitting member 181D in such a manner as to allow a swinging movement. The other end of the swing lever 188D is linked with the inner cable 191. In response to a pull of the inner cable 191 in the state of FIG. 27 in a direction of an open arrow, the swing lever 188D swings to press the pressure bar 182D as shown in FIG. 28.

C. Third Embodiment

Figure 29:
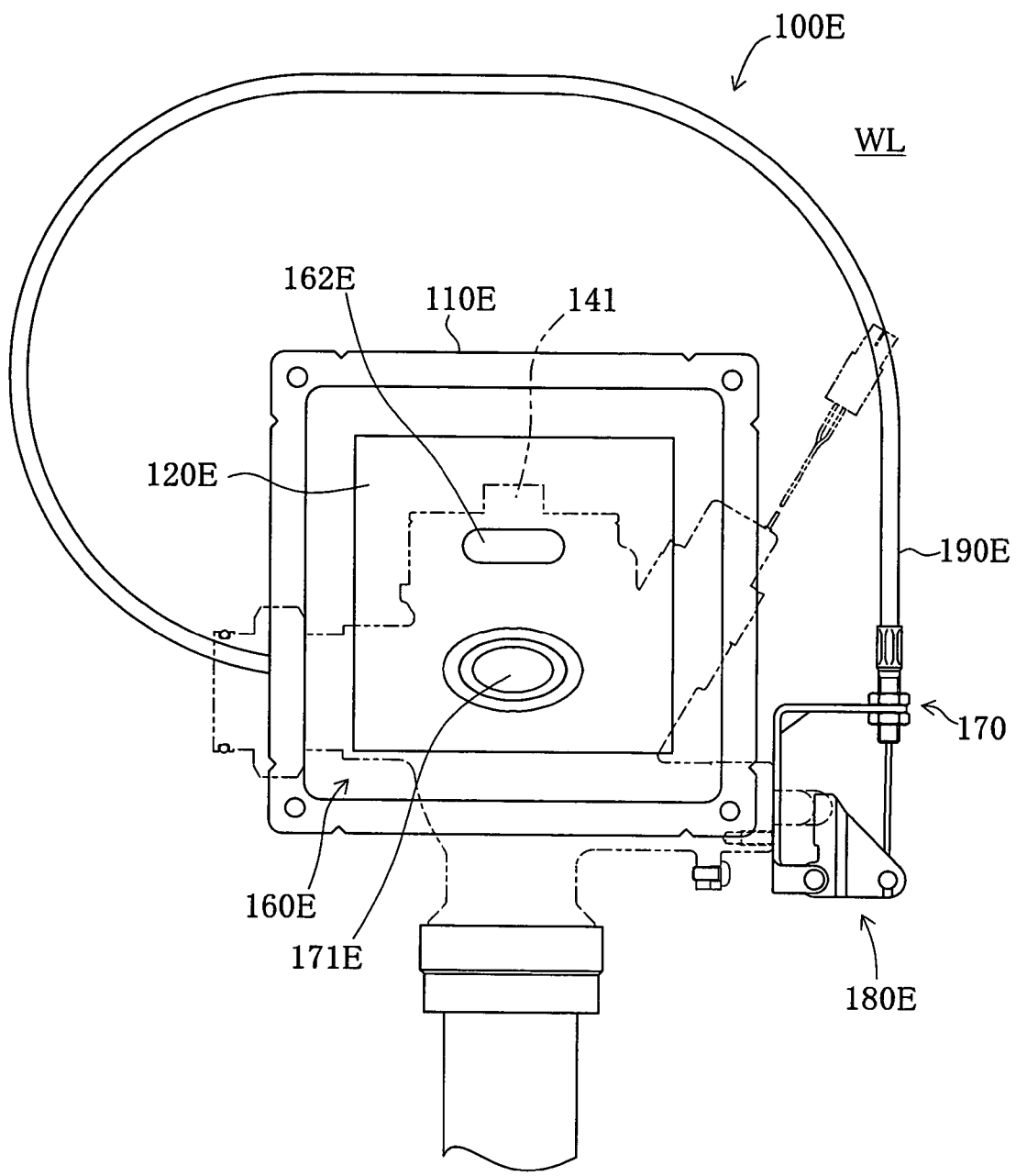
FIG. 29 is a front view illustrating a flush valve device 100E in a third embodiment.
Figure 30:
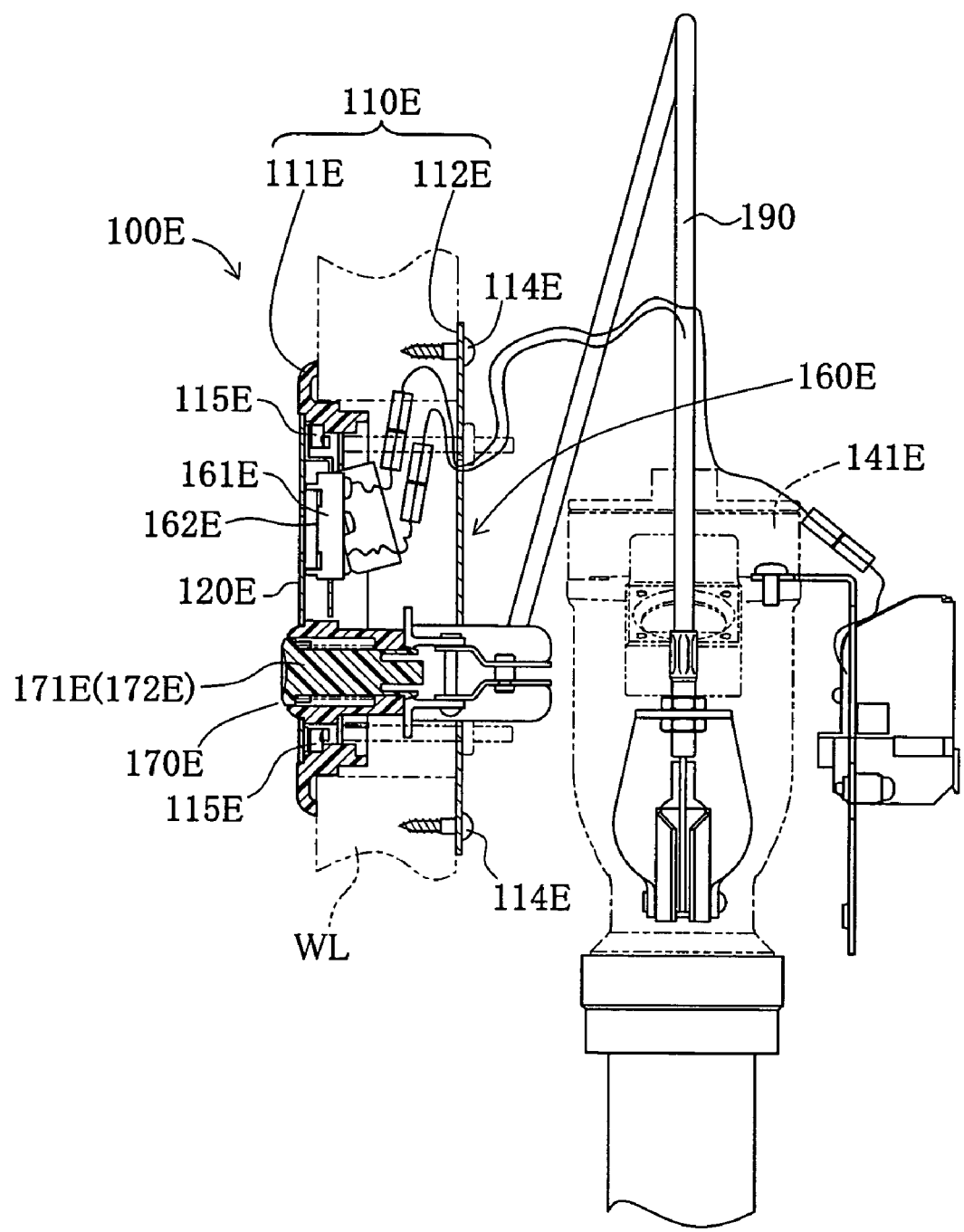
FIG. 30 is a side view illustrating the flush valve device 100E.

FIG. 29 is a front view illustrating a flush valve device 100E in a third embodiment. FIG. 30 is a side view illustrating the flush valve device 100E. The flush valve device 100E has a flush valve body 141E located in a rear space of a bathroom wall WL and is accessible for maintenance from the rear side of the bathroom wall WL. The flush valve device 100E includes a wall fixation frame 110E, a cover panel 120E, and a valve actuation unit 160E, in addition to the flush valve body 141E. The wall fixation frame 110E and the cover panel 120E are used to arrange a body detection sensor 162E and a button unit 171E of a manual operation unit 170E.

Figure 31:
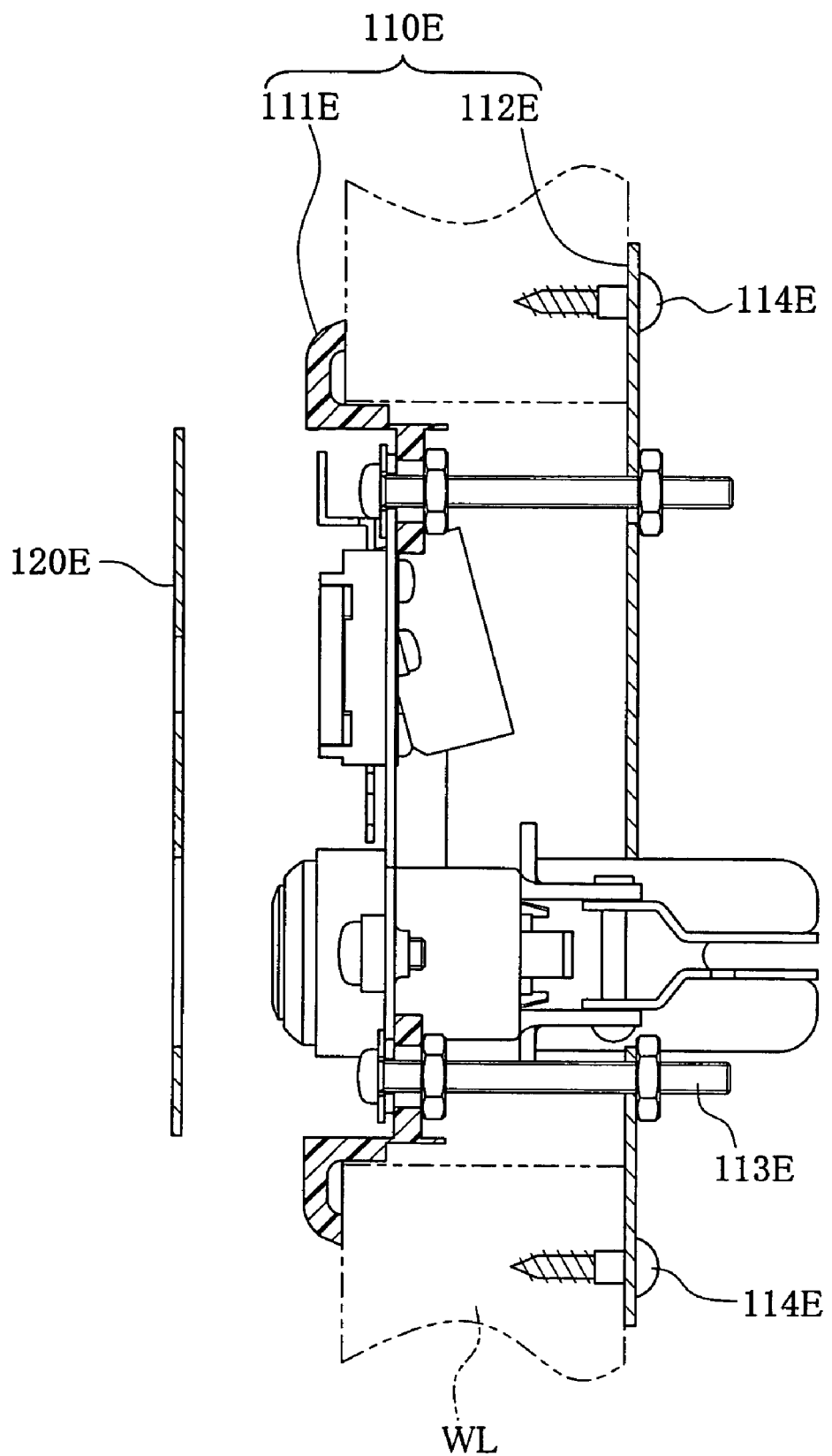
FIG. 31 is a sectional view illustrating the periphery of a wall fixation frame 110E.
Figure 32:
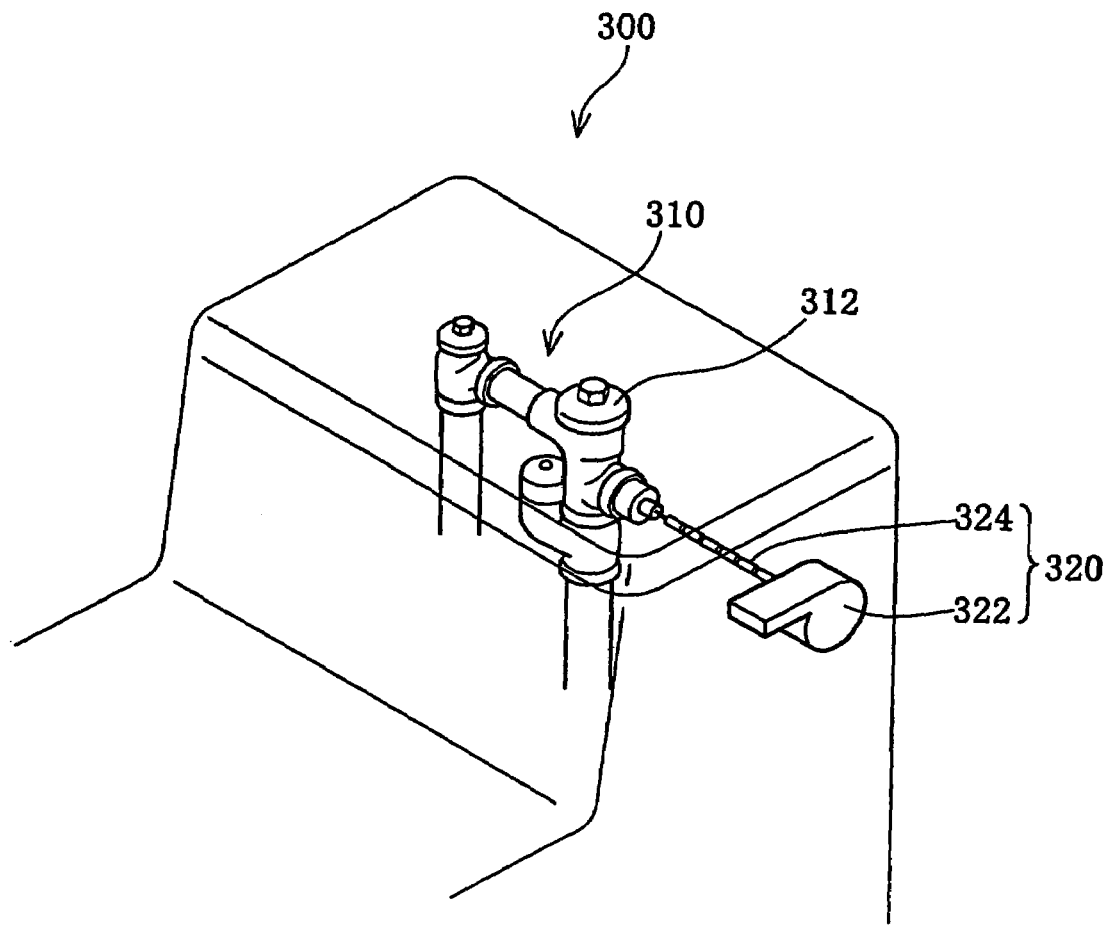
FIG. 32 illustrates a rear portion of a flush toilet with a prior art flush valve device mounted thereon.

FIG. 31 is a sectional view illustrating the periphery of the wall fixation frame 110E. The wall fixation frame 110E includes a front frame 111E and a rear support plate 112E. The front frame 111E and the rear support plate 112E are fixed to the bathroom wall WL by means of clamping members 113E of bolts and nuts and screws 114E. The body detection sensor 162E and its driving circuit are mounted on the wall fixation frame 110E. Fixing magnets 115E,115E (see FIG. 30) are set on the upper portion and the lower portion of the front frame 111E to draw the cover panel 120E, so that the cover panel 120E is attached to the wall fixation frame 110E. The cover panel 120E is detachable from the wall fixation frame 110E with a suction disc or another suitable tool.

Referring to FIG. 30, the flush valve body 141E is located in the rear space of the bathroom wall WL, and the valve actuation unit 160E functions to open and close the flush valve body 141E. Like the second embodiment, the valve actuation unit 160E includes an auto water flow mechanism 161E driven by outputs of the body detection sensor 162E and a manual operation unit 170E. The manual operation unit 170E has a button unit 171E, a tilting mechanism 180E, and a cable mechanism 190E. The button unit 171E is fixed to the wall fixation frame 110E.

In the flush valve device 100E of this embodiment, the button unit 171E is fixed to the wall fixation frame 110E, while the cover panel 120E is detachable. This structure facilitates inspection of the body detection sensor 162E and its driving circuit. The body detection sensor 162E and its driving circuit may be mounted on the cover panel 120E, instead of the wall fixation frame 110E, as long as no trouble arises in the course of attachment and detachment of the cover panel 120E.

No screws are used for attachment of the cover panel 120E to the wall fixation frame 110E. A special tool like a suction disk is required for detachment of the cover panel 120E. This structure effectively prevents the cover panel 120E from being detached accidentally or purposefully with no needs, which may cause a failure.

The button unit 171E is fixed to the wall fixation frame 110E, so that the protrusion from the cover panel 120E is desirably shortened. This structure effectively prevents the cover panel 120E from interfering with the pressing action of the finger on the operation button 172E of the button unit 171E and does not cause any large external force to be applied from the finger to the operation button 172E. This structure effectively prevents the cover panel 120E from being detached accidentally.

The flush valve body 141E is connectable with the operation button 172E via the cable mechanism 190E. The operation button 172E may thus be located at a position apart from the wall fixation frame 110E. This desirably increases the degree of freedom in positioning of the operation button 172E.

The above embodiments and their modified examples are to be considered in all aspects as illustrative and not restrictive. There may be many modifications, changes, and alterations without departing from the scope or spirit of the main characteristics of the present invention. Some examples of possible modification are given below.

(1) The flush valve body 22 is placed in the cabinet 18 in the above embodiment, but may be set in another place, for example, in a box built in the wall.

(2) In the above embodiment, the operation button is located on the lateral side of the toilet body, while the flush valve body is located on the rear side of the toilet body. This layout is, however, not restrictive at all, and their locations may be exchanged. Neither the layout nor the length of the flexible transmission member (inner cable) is restricted, as long as the layout and the length ensure transmission of the force.

(3) The body detection sensor 162 and the valve driving circuit 164 are attached to the cover panel 120 in the above embodiment, but may be attached to the upper portion of the wall fixation frame 110. This arrangement further facilitates attachment and detachment of the cover panel 120.

INDUSTRIAL APPLICABILITY

The technique of the present invention is applicable to a flush valve device, which is used to flush a supply of washing water into a flush toilet.

What is claimed is:

1. A flush valve device of a flush toilet, the flush valve device comprising:
   a flush valve body having: a main valve that is disposed in a main water conduit to open and close the main water conduit; a pilot valve that presses the main valve in a closing direction and parts a back pressure chamber; and a driving rod that is attached to the pilot valve, wherein the driving rod is inclined to lower water pressure in the back pressure chamber and thereby open the main valve; and
   a manual operation unit that functions to open the pilot valve, wherein a supply of washing water is flown into a toilet bowl in response to an operation of the manual operation unit,
   wherein the manual operation unit includes:
   a flexible transmission member;
   an operation button that is pushed up and down in response to a pressing operation;
   an operating force conversion mechanism that is coupled with one end of the transmission member and converts an operating force generated by the pressing operation of the operation button into a tensile force of pulling the transmission member, wherein the operating force conversion mechanism includes a spring that restores the operation button, which has been subjected to the pressing operation, to an original position thereof, and a slide member that pulls the transmission member in a sliding direction, the slide member having an inclined plane to convert the operating force of the operation button into a moving force in a direction substantially perpendicular to a direction of the operating force; and
   a tilting mechanism that is coupled with the other end of the transmission member and moves to incline the driving rod in response to a pull of the transmission member.

2. A flush valve device of a flush toilet in accordance with claim 1, wherein whole or part of the transmission member comprises a wire that is bendable and transmits the operating force in a bended state.

3. A flush valve device of a flush toilet in accordance with claim 2, wherein the wire is made of a metal.

4. A flush valve device of a flush toilet in accordance with claim 3, wherein the transmission member is coated with a cover member that supports the transmission member in a slidable manner.

5. A flush valve device of a flush toilet in accordance with claim 2, wherein the operation button and the flush valve body are arranged substantially perpendicular to a center of the flush toilet, and the transmission member is bent and arranged at substantially right angles to couple the operation button with the flush valve body.

6. A flush valve device of a flush toilet in accordance with claim 1, wherein the tilting mechanism comprises an engagement member that engages with the driving rod and thereby inclines the driving rod in response to a pull of the transmission member.

7. A flush valve device of a flush toilet in accordance with claim 6, wherein the tilting mechanism comprises a spring that presses a pressure bar against a moving force of the pressure bar in response to a pull of the transmission member and restores the pressure bar to an original position thereof when the tensile force is released.

8. A flush valve device of a flush toilet in accordance with claim 1, wherein the tilting mechanism comprises: a pressure bar that presses and thereby inclines the driving rod; and a pressing force conversion member that converts a tensile force of the transmission member into a force of pressing the driving rod.

9. A flush valve device of a flush toilet in accordance with claim 8, wherein the tilting mechanism comprises a spring that presses the pressure bar against a moving force of the pressure bar in response to a pull of the transmission member and restores the pressure bar to an original position thereof when the tensile force is released.

10. A flush valve device of a flush toilet in accordance with claim 9, wherein the tilting mechanism comprises a rotary member that has one end supported on a valve body in a pivotally rotatable manner and the other end coupled with the transmission member and applies a pressing force to the pressure bar in response to a tensile force of the transmission member.

11. A flush valve device of a flush toilet in accordance with claim 9, wherein the tilting mechanism comprises a coupling board that is arranged to move in parallel in an identical direction with a forward-backward moving direction of the pressure bar and applies a pressing force to the pressure bar in response to a tensile force of the transmission member.

12. A flush valve device of a flush toilet in accordance with claim 9, wherein the tilting mechanism comprises a swing lever that has one end supported on a valve body in a swinging manner and the other end coupled with the transmission member and applies a pressing force to the pressure bar in response to a tensile force of the transmission member.

13. A flush valve device of a flush toilet in accordance with claim 1, wherein the tilting mechanism is configured such that the main valve and the pilot valve is removable from the flush valve member while the tilting mechanism is attached to the flush valve member.

14. A flush valve device of a flush toilet in accordance with claim 1, wherein the operation button subjected to the pressing operation has an operating face that is formed to a concave curve around the shape of a finger.

15. A flush valve device of a flush toilet in accordance with claim 1, the flush valve device further comprising:
a partition wall that is arranged to face a bathroom across a space for receiving the flush valve body therein;
a wall fixation frame to be mounted on the partition wall; and
a cover panel attached to the wall fixation frame to face the bathroom,
wherein the manual operation unit is fixed to the wall fixation frame.

16. A flush valve device of a flush toilet in accordance with claim 15, wherein the partition wall is a bathroom wall surrounding the bathroom.

17. A flush valve device of a flush toilet in accordance with claim 15, wherein the partition wall is a side wall of a cabinet located in the bathroom.

18. A flush valve device of a flush toilet, the flush valve device comprising:
a flush valve body having: a main valve that is disposed in a main water conduit to open and close the main water conduit; a pilot valve that presses the main valve in a closing direction and parts a back pressure chamber; and a driving rod that is attached to the pilot valve, where the driving rod is inclined to lower water pressure in the back pressure chamber and thereby open the main valve; and
a manual operation unit that functions to open the pilot valve, wherein a supply of washing water is flown into a toilet bowl in response to an operation of the manual operation unit, and
wherein the manual operation unit includes:
a flexible transmission member;
an operation button that is pushed up and down in response to a pressing operation;
an operating force conversion mechanism that is coupled with one end of the transmission member and converts an operating force generated by the pressing operation of the operation button into a tensile force of pulling the transmission member; and
a tilting mechanism that is coupled with the other end of the transmission member and moves to incline the driving rod in response to a pull of the transmission member,
wherein the flush valve device further includes:
a partition wall that is arranged to face a bathroom across a space for receiving the flush valve body therein;
a wall fixation frame to be mounted on the partition wall, wherein the wall fixation frame includes an inspection opening that is used for inspection of the flush valve body; and
a cover panel attached to the wall fixation frame to face the bathroom and cover the inspection opening.

19. A flush valve device of a flush toilet in accordance with claim 18, wherein the wall fixation frame is made of a resin.

20. A flush valve device of a flush toilet in accordance with claim 19, wherein the cover panel is attached to the wall fixation frame by means of magnetic force.

21. A flush valve device of a flush toilet in accordance with claim 15, the flush valve device further comprising:
an auto water flow mechanism that detects a human body with a sensor to actuate the flush valve body.

22. A flush valve device of a flush toilet, the flush valve device comprising:
a flush valve body having: a main valve that is disposed in a main water conduit to open and close the main water conduit; a pilot valve that presses the main valve in a closing direction and parts a back pressure chamber; and a driving rod that is attached to the pilot valve, where the driving rod is inclined to lower water pressure in the back pressure chamber and thereby open the main valve; and a manual operation unit that functions to open the pilot valve, wherein a supply of washing water is flown into a toilet bowl in response to an operation of the manual operation unit, wherein the manual operation unit includes:

a flexible transmission member;

an operation button that is pushed up and down in response to a pressing operation;

an operating force conversion mechanism that is coupled with one end of the transmission member and converts an operating force generated by the pressing operation of the operation button into a tensile force of pulling the transmission member; and a tilting mechanism that is coupled with the other end of the transmission member and moves to incline the driving rod in response to a pull of the transmission member, wherein the flush valve device further includes:

a partition wall that is arranged to face a bathroom across a space for receiving the flush valve body therein; wherein the partition wall has fixation walls facing each other across a preset interval;

a wall fixation frame to be mounted on the partition wall, wherein the wall fixation frame has a substantially rectangular frame assembly including fixation frames arranged along the fixation walls and joint frames for joining the fixation frames with each other, an opening defined by the frame assembly, and fixtures formed on the fixation frames;

a cover panel attached to the wall fixation frame to face the bathroom;

frame clamps, each of which has a front piece and a side piece to be formed in an L shape and is used to fix the wall fixation frame to the fixation wall;

first fasteners, each of which is used to fix the front piece to the fixture at a changeable fixation position along the fixation wall; and second fasteners, each of which is used to fix the side piece close to the fixation wall.

23. A flush valve device of a flush toilet in accordance with claim 22, wherein each of the fixation frames has a notch in a periphery of the fixture to prevent engagement of the second fastener with the fixation frame and to allow direct attachment of the second fastener to the fixation wall.

24. A flush valve device of a flush toilet in accordance with claim 23, wherein each of the fixtures has a fixation recess to slidably position the frame clamp.

25. A flush valve device of a flush toilet in accordance with claim 22, wherein each of the first fasteners has a screw and nut used to fix the frame clamp to the fixture, and each of the frame clamps has a slot that the first fastener passes through and is used to change the fixation position.

26. A flush valve device of a flush toilet in accordance with claim 22, wherein each of the second fasteners has a screw that is screwed in the fixation wall.

* * * * *